United States Patent
Muroi et al.

(10) Patent No.: US 7,230,401 B2
(45) Date of Patent: Jun. 12, 2007

(54) APPARATUS AND METHOD FOR CONTROLLING AN ELECTRIC MOTOR

(75) Inventors: Kazushige Muroi, Nagoya (JP); Shigeki Akiyama, Ichinomiya (JP); Masaru Takeuchi, Handa (JP); Mitsuhiro Nozaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/383,587

(22) Filed: Mar. 10, 2003

(65) Prior Publication Data

US 2003/0184248 A1    Oct. 2, 2003

(30) Foreign Application Priority Data

Mar. 27, 2002  (JP)  ............................. 2002-088731
Mar. 28, 2002  (JP)  ............................. 2002-091988

(51) Int. Cl.
G05B 5/00    (2006.01)
G05D 3/00    (2006.01)
H02H 7/08    (2006.01)
H02P 1/04    (2006.01)
H02P 3/00    (2006.01)

(52) U.S. Cl. ..................... 318/466; 318/599; 318/811
(58) Field of Classification Search ............... 318/466, 318/568.17, 592, 811, 599
See application file for complete search history.

(56) References Cited

U.S. PATENT DOCUMENTS

| 4,503,369 | A | * | 3/1985 | Nishijima et al. ........... 318/254 |
| 5,189,349 | A | * | 2/1993 | Haga ........................ 318/254 |
| 5,274,203 | A | * | 12/1993 | Skalski et al. ............. 187/393 |
| 5,287,137 | A | * | 2/1994 | Hara et al. .................. 396/87 |
| 5,293,628 | A | * | 3/1994 | Langan et al. .............. 713/502 |
| 5,598,396 | A | * | 1/1997 | Horibe et al. ............ 369/47.25 |
| 5,804,724 | A | * | 9/1998 | Lansberry et al. ............ 73/488 |
| 5,856,736 | A | * | 1/1999 | Rotunda et al. ............ 318/802 |
| 5,886,491 | A |   | 3/1999 | Yoshida et al. |
| 6,040,673 | A | * | 3/2000 | Isomura et al. ............ 318/615 |
| 6,124,697 | A | * | 9/2000 | Wilkerson .................. 318/798 |
| 6,175,272 | B1 | * | 1/2001 | Takita ......................... 330/10 |

(Continued)

FOREIGN PATENT DOCUMENTS

JP    A-4-165981    6/1992

(Continued)

*Primary Examiner*—Lincoln Donovan
*Assistant Examiner*—Erick Glass
(74) *Attorney, Agent, or Firm*—Oliff & Berridge, PLC

(57) ABSTRACT

An apparatus for controlling an electric motor provided to drive a movable object such that a detected actual amount of motion of a movable portion of the electric motor or the movable object coincides with a target amount, comprising: a control-condition changing device operable to change at least one of (a) a resolution of detection of the actual amount of motion and (b) a voltage to be applied to the electric motor, depending upon the target amount; and a feedback motor controller operable to control the electric motor by application of the voltage, on the basis of the actual amount of motion detected with the resolution of detection and the target amount, such that the detected actual amount of motion coincides with the target amount. Also disclosed is a motor control method wherein the resolution of detection of the actual amount of motion and/or the voltage of the motor is/are changed depending upon the target amount of motion.

21 Claims, 18 Drawing Sheets

U.S. PATENT DOCUMENTS

| | | | |
|---|---|---|---|
| 6,483,270 B1 * | 11/2002 | Miyazaki et al. | 318/700 |
| 6,515,443 B2 * | 2/2003 | Kelly et al. | 318/599 |
| 6,870,346 B2 * | 3/2005 | Davidov | 318/685 |
| 2003/0210009 A1 * | 11/2003 | Minciunescu | 318/599 |

FOREIGN PATENT DOCUMENTS

| | | |
|---|---|---|
| JP | A 7-205514 | 8/1995 |
| JP | A-9-93998 | 4/1997 |
| JP | A 9-271191 | 10/1997 |
| JP | A-11-341878 | 12/1999 |
| JP | A 2001-219613 | 8/2001 |

\* cited by examiner

| TARGET FEED DISTANCE (inch) | VOLTAGE VALUE (V) |
|---|---|
| 0 ~ 0.01 | 1.0 |
| 0.01 ~ 0.05 | 2.0 |
| 0.05 ~ 0.10 | 4.0 |
|  |  |
|  | 28.0 |
|  | 30.0 |

| TARGET FEED DISTANCE (inch) | VOLTAGE VALUE (V) |
|---|---|
| 0 ~ 0.01 | 0 |
| 0.01 ~ 0.05 | 0 |
| 0.05 ~ 0.10 | 0 |
|  |  |
|  | 0 |
|  | 0 |

APPARATUS AND METHOD FOR CONTROLLING AN ELECTRIC MOTOR

The present application is based on Japanese Patent Application Nos. 2002-088731 and 2002-091988 respectively filed on Mar. 27, 2002 and Mar. 28, 2002, the contents of which are incorporated herein by reference.

BACKGROUND OF THE INVENTION

1. Field of the Invention

The present invention relates to an apparatus and a method for controlling an electric motor by feedback control to control a motion of a movable object, and also relates to an apparatus and a method for controlling an electric motor by pulse width modulation (PWM).

2. Discussion of Related Art

There is known an apparatus arranged to control an electric motor by feedback control to control a motion of a movable object. This type of motor control apparatus includes an encoder for detecting an actual amount of motion of the movable object driven by the electric motor, and is arranged to control the electric motor such that the detected actual amount of motion coincides with a desired or target value.

In the motor control apparatus described above, the counted number of pulses of an output signal of the encoder is used as a feedback input representative of the actual amount of motion of the movable object. To improve the accuracy of coincidence of the actual amount of motion with the target value, it is required to reduce a minimum amount of motion that can be detected by the encoder, that is, to increase the resolution of detection of the actual motion of the movable object. For example, the resolution of detection can be increased by counting both of rising and falling edges of the encoder signal pulses, or by counting pulses of a plurality of output signals of the encoder which have a predetermined phase difference.

However, an increase in the resolution of detection of the actual motion of the movable object results in an increase in the counted number of the encoder signal pulses for unit amount of the motion, and accordingly an increase in the required memory areas of a register used to count the number of the encoder signal pulses and an arithmetic unit used to perform arithmetic operations for the feedback control of the electric motor.

Where the actual amount of motion of the movable object is detected with a relatively low degree of resolution to reduce the required memory areas of the register and arithmetic unit, an error of detection of the actual amount of motion tends to be large when the target amount of motion is relatively large. Accordingly, the relatively low resolution of detection of the actual amount of motion of the movable object has a risk of failure to accurately control the electric motor for coincidence of the actual amount of motion with the target value.

Therefore, the conventional motor control apparatus is required to detect the actual amount of motion of the movable object with a relatively high degree of resolution, for accurately control the electric motor even when the target amount of motion of the movable object is relatively small. The conventional motor control apparatus is further required to use a register and an arithmetic unit having memory areas large enough to permit the detection of the actual amount of motion with the relatively high resolution when the target amount of motion is relatively large. In this arrangement of the motor control apparatus, the arithmetic operations performed by the arithmetic unit involve a comparatively large number of encoder signal pulses and result in a relatively large load on the apparatus for the feedback control of the electric motor when the target amount of motion (target distance of movement) of the movable object is large. When the target amount of motion is relatively small, on the other hand, the efficiency of utilization of the memory areas of the register and arithmetic unit is extremely low since the counted number of the encoder signal pulses is small.

For example, an electric motor is used to rotate a paper feed roller in a paper feeding mechanism of a printer, for feeding a sheet of paper. The electric motor is driven according to a pulse signal (PWM signal) generated by pulse width modulation (PWM). Namely, an amount of electric current to be applied to the electric motor is controlled by controlling the duty ratio of the PWM signal, so that the operating speed of the electric motor is controlled.

To increase an efficiency of a printing operation performed by the printer, it is required to increase a speed of feeding the paper sheet. To this end, a relatively high voltage is generally applied to the electric motor, and the electric motor is operated at a high speed during an initial portion of an operation of the motor to achieve a feeding motion of the paper sheet, by application of a relatively large amount of electric current to the motor, with the PWM signal being controlled to have a relatively high duty ratio.

To assure a high degree of positioning accuracy of the paper sheet, the duty ratio of the PWM signal is gradually reduced to slowly decelerate the electric motor as the actual distance of movement of the paper sheet approaches a target value. In this respect, it is noted that the paper sheet would have a variation in its stop position, if the electric motor were operated at a high speed immediately before the electric motor is braked at a position at which the actual distance of movement of the paper sheet has almost reached the target value. Namely, the electric motor operating at a high speed cannot be instantaneously brought to a complete stop.

When the target distance of movement of the paper sheet is relatively small, the duty ratio of the PWM signal is controlled to be relatively low even in an initial portion of the operation of the electric motor, so that the electric motor is operated at an accordingly low speed, permitting the paper sheet to be stopped exactly at a position corresponding to the target distance of movement.

When the target distance of movement of the paper sheet is small while the voltage to be applied to the electric motor is relatively high, however, the range in which the duty ratio of the PWM signal is variable so as to feed the paper sheet at a low speed tends to be narrow, and a dynamic range of the electric current applicable to the electric motor is accordingly narrow, making it difficult to intricately control the operating speed of the electric motor.

In the known printer, therefore, the operating speed of the electric motor when the target distance of movement of the paper sheet is relatively small has a relatively large amount of variation, and an accordingly large amount of variation in the stop position of the paper sheet at which a printing operation is effected.

SUMMARY OF THE INVENTION

It is an object of the present invention to provide an improvement over at least one of (a) the known motor control apparatus and method which suffer from a heavy load in the feedback control of an electric motor when a target amount of motion of a movable object driven by the electric motor is relatively large, or a low efficiency of utilization of memory areas of a register and an arithmetic unit when the target amount of motion of the movable object is relatively small, and (b) the known motor control apparatus and method which suffer from a low degree of accuracy of coincidence of an actual amount of motion of a movable portion of an electric motor or a movable object driven by the electric motor, with a target value when the target value is relatively small.

The object indicated above may be achieved according to any one of the following modes of the present invention in the form of a motor control apparatus or a motor control method, each of which is numbered like the appended claims and depends from the other mode or modes, where appropriate, for easier understanding of technical features disclosed in the present application and possible combinations of those features. However, it is to be understood that the invention is not limited to those technical features or combinations thereof, and that any one of a plurality of technical features described below with respect to any one mode of the invention may be a subject matter of the present invention, without the other technical feature or features being combined with that one technical feature.

(1) An apparatus for controlling an electric motor provided to drive a movable object such that a detected actual amount of motion of a movable portion of said electric motor or the movable object coincides with a target amount, comprising:

a control-condition changing device operable to change at least one of a resolution of detection of the actual amount of motion and a voltage to be applied to the electric motor, depending upon the target amount; and a feedback motor controller operable to control the electric motor by application of the voltage, on the basis of the target amount and the actual amount of motion detected with the resolution of detection, such that the detected actual amount of motion coincides with the target amount.

Where the control-condition changing device is operable to change the resolution of detection of the actual amount of motion of the movable portion of the electric motor or the actual amount of motion of the movable object driven by the electric motor, the resolution of detection of the actual amount of motion is changed depending upon the target amount. Where the resolution of detection decreases with an increase in the target amount of motion, this change of the resolution of detection of the actual amount of motion is effective to reduce the load on the feedback motor controller in the feedback control of the electric motor when the target amount of motion is relatively large, and is also effective to prevent considerable reduction in the efficiency of utilization of memory areas of a register and an arithmetic unit used in the apparatus when the target amount of motion is relatively small.

Where the control-condition changing device is operable to change the voltage to be applied to the electric motor, the voltage to be applied to the electric motor is changed depending upon the target amount. Where the voltage decreases with an increase in the target amount of motion, this change of the voltage of the electric motor is effective to permit the duty ratio of a pulse-width-modulation signal to be applied from the feedback motor controller to the electric motor, to be controlled in a relatively wide range even when the target amount of motion of the movable portion of the electric motor or the movable object is relatively small. Accordingly, the speed of the motion of the movable object driven by the electric motor can be intricately controlled with high accuracy even when the target amount of motion is relatively small.

(2) An apparatus according to the above mode (1), further comprising:

a pulse generator operable to periodically generate signal pulses such that each of the signal pulses is generated each time the movable portion of the electric motor or the movable object is driven by a predetermined amount; and an edge counter operable to count the number of at least one of a rising edge and a falling edge of the signal pulses generated by the pulse generator, wherein the control-condition changing device includes (a) a target-motion-amount setter operable to set the target amount of motion of the movable portion or the movable object, (b) a resolution selector operable to select one of different manners of counting the signal pulses, for thereby selecting a degree of the resolution of detection of the actual amount of motion, depending upon the target amount of motion set by the target-motion-amount setter, and (c) a target-count calculator operable to calculate a target number of the edges of the signal pulses which corresponds to the target amount set by the target-motion-amount setter, on the basis of the degree of the resolution of detection selected by the resolution selector, and wherein the feedback motor controller compares the number of the edges of the signal pulses counted by the edge counter with the target number of the edges calculated by the target-count calculator, and performs a feedback control of the electric motor for coincidence of the number of the edges of the signal pulses counted by the edge counter with the target number.

In the motor control apparatus according to the above mode (2), the resolution selector selects the degree of the resolution of detection of the actual amount of motion on the basis of the target amount of motion, and the target-count calculator calculates the target number of the edges of the signal pulses corresponding to the target amount of motion, on the basis of the selected degree of the resolution. Where the degree of the resolution decreases with an increase in the target amount of motion, this change prevents a considerable change in the number of the edges of the signal pulses counted by the edge counter, which would take place due to a change in the target amount of motion. Accordingly, the present motor control apparatus does not suffer from a heavy load on the feedback motor controller in the feedback control of the electric motor when the target amount of motion is relatively large, or considerable reduction in the efficiency of utilization of memory areas of a register and an arithmetic unit used in the apparatus when the target amount of motion is relatively small.

The pulse generator is arranged to periodically generate the signal pulses such that each pulse is generated for each operation of the electric motor or each motion of the movable object driven by the electric motor by a predetermined amount. For example, the pulse generator uses a rotary or linear encoder which includes an element attached to the movable object or the electric motor and which generates an encoder signal pulse each time the movable portion of the electric motor or the movable object is driven by the predetermined amount.

The edge counter is arranged to count the number of the rising or falling edges of the signal pulses generated by the pulse generator, or both of the rising and falling edges of the generated signal pulses. The edge counter may include an edge detecting portion operable to detect the edges of the signal pulses, and an edge counting portion operable to count the number of the edges detected by the edge detecting portion.

The target-motion-amount setter is arranged to set, hold or store the target amount of motion of the movable portion of the electric motor or the movable object driven by the electric motor. The target amount of motion may be a desired angle of rotation of the movable portion of the electric motor or the movable object in the form of a rotary member, or a desired distance of movement of the movable object.

The resolution selector is arranged to select the degree of the resolution of detection of the actual amount of motion, depending upon the target amount of motion set by the target-motion-amount setter. The resolution of detection is interpreted to mean a minimum distance of movement of the movable object that can be detected. The minimum detectable distance of movement decreases with an increase in the degree of the resolution. Since the degree of the resolution of the actual amount of motion is changed depending upon an interval between the adjacent edges of the signal pulses that are counted by the edge counter, the term "resolution of detection of the actual amount of motion" may be replaced by the term "resolution of counting of the edges of the signal pulses". In the present motor control apparatus wherein the signal pulses are periodically generated by the pulse generator such that each signal pulse is generated each time the movable portion of the electric motor or the movable object driven by the electric motor is driven by the predetermined amount, the resolution of detection of the actual amount of motion can be changed by changing the interval between the edges of the signal pulses counted by the edge counter. Described in detail, the minimum detectable amount of the movable object is shorter when both of the rising and falling edges of the signal pulses are counted at an interval corresponding to ½ of the period of the signal pulses, than when only the rising edges of the signal pulses are counted at an interval corresponding to the period of the signal pulses.

The target-count calculator is arranged to calculate the target number of the edges of the signal pulses corresponding to the target amount of motion, on the basis of the degree of the resolution of detection of the actual amount of motion selected by the resolution selector. That is, the target-count calculator converts the target amount of motion into the corresponding number of the edges of the signal pulses. Described more specifically, the target-count calculator calculates the target number of the edges of the signal pulses, by dividing the target amount of motion by the minimum detectable amount represented by the selected degree of the resolution of detection.

In the present motor control apparatus, the feedback motor controller is arranged to compare the number of the edges of the signal pulses counted by the edge counter with the target number of the edges calculated by the target-count calculator. However, the target-count calculator may be replaced by an actual-motion-amount calculator operable to calculate the actual amount of motion on the basis of the degree of the resolution of detection selected by the resolution selector and the number of the edges counted by the edge counter. In this case, the feedback motor controller is arranged to compare the actual amount of motion calculated by the actual-motion-amount calculator with the target amount of motion.

(3) An apparatus according to the above mode (2), wherein the resolution selector selects the degree of the resolution of detection of the actual amount of motion such that the selected degree of the resolution of detection is lower when the target amount of motion is relatively large than when the target amount of motion is relatively small.

In the motor control apparatus according to the above mode (3), the degree of the resolution of detection of the actual amount of motion is made lower when the target amount of motion is relatively large than when the target amount of motion is relatively small.

(4) An apparatus according to the above mode (2) or (3), wherein the pulse generator is capable of generating a first pulse signal and a second pulse signal which have a predetermined phase difference therebetween, and the edge counter includes:

a first edge counter operable to count the rising edges of pulses of the first pulse signal;

a second edge counter operable to count the falling edges of the pulses of the first pulse signal;

a third edge counter operable to count the rising edges of pulses of the second pulse signal; and a fourth edge counter operable to count the falling edges of the pulses of the second pulse signal, and wherein the resolution selector selects the degree of the resolution of detection, by selecting an edge-counting mode in which the edges of the signal pulses are counted, from among a first edge-counting mode in which only the first edge counter is operated to establish a first degree of resolution, a second edge-counting mode in which the first and second edge counters are operated to establish a second degree of resolution higher than the first degree of resolution, a third edge-counting mode in which all of the first, second, third and fourth edge counters are operated to establish a third degree of resolution higher than the second degree of resolution.

In the motor control apparatus according to the above mode (4), the resolution selector selects the degree of the resolution of detection of the actual amount of motion, by selecting an appropriate one of the three edge-counting modes described above.

(5) An apparatus according to any one of the above modes (2)–(4), wherein the resolution selector increases the degree of the resolution of detection when the detected actual amount of motion has increased to an amount which is smaller by a predetermined amount than the target amount of motion set by the target-motion-amount setter.

In the motor control apparatus according to the above mode (5), the degree of the resolution of detection is increased from the presently selected degree to a higher degree when the detected actual amount of motion has increased to a predetermined amount slightly smaller than the target amount of motion. Where the target amount of motion is relatively large, for example, the resolution of detection of the actual amount of motion is initially selected to be a relatively low degree and held at this low degree until the movable object is moved at a relatively high speed to a resolution-changing position close to a stop position represented by the target amount of motion. When the movable object has reached the resolution-changing position, the resolution of detection is increased with respect to the initial degree, so that the movable object can be stopped at the stop position with high accuracy.

The "predetermined amount" by which the actual amount of motion is smaller than the target amount of motion represents a predetermined distance between the above-indicated resolution-changing position and the stop position which is represented by the target amount of motion and at which the movable object is stopped. This predetermined distance may be either held constant for all different target amounts of motion, or may be changed as a function of the specific target amount of motion set by the target-motion-amount setter, or example, may be changed so as to be a predetermined percentage (e.g., 10%) of the specific target amount of motion.

The motor control apparatus of the present invention described above may be arranged to control an electric motor provided to move the movable object in the form of a recording medium or a printing head in a printer wherein the recording medium and the printing head are moved relative to each other by the electric motor. The printer may be an ink-jet printer wherein the printing head is arranged to deliver droplets of an ink from nozzles at each stop position of the recording medium or the printing head established by each relative movement between the recording medium and the printing head according to a target distance of the relative movement, which is one form of the target amount of motion of the movable object. That is, each target distance of relative movement between the recording medium and the printing head in the printer represents a desired ink-delivery interval between adjacent positions on the recording medium at which the droplets of ink are delivered from the printing head.

When the ink-delivery interval is relatively large, as in the case of printing an image with a relatively low degree of resolution, a slight variation in the ink-delivery interval is not likely to cause a considerable reduction in the quality of the printed image. Accordingly, the printing operation at a relatively large ink-delivery interval or with a relatively large target distance of relative movement of the recording medium and the printing head does not require a high degree of accuracy of control of the actual distance of movement of the movable object (recording medium or printing head) with respect to the target distance of movement.

Where the ink-delivery interval indicated above is larger than the width of a row of the nozzles of the printing head, there is left a blank space within the ink-delivery interval (where a plurality of lines of image are printed with a blank space left between the adjacent lines of image in the primary or secondary scanning direction, for example). In this case where the ink-delivery interval is relatively large or the target distance of movement of the movable object is relatively large, it is not necessary to control the actual distances of movement of the movable object (recording medium or printing head) so accurately, but it is desired to move the movable object at a relatively high speed to each stop position corresponding to the target distance of movement of the movable object.

In view of the tendency or fact indicated above, the motor control apparatus for an ink-jet type printer described above is preferably constructed as described below with respect to the following mode (6).

(6) An apparatus according to any one of claims 2–5, wherein said resolution selector selects a lowest one of different degrees of said resolution of detection, when said target amount of motion set by said target-motion-amount setter is larger than a predetermined threshold value.

The motor control apparatus according to the above mode (6) is preferably used for an ink-jet printer wherein a printing head is arranged to deliver droplets of an ink to form an image on a recording medium and wherein one of the recording medium and the printing head is moved as the movable object by the electric motor.

In the motor control apparatus according to the above mode (6), the resolution selector selects the lowest degree of resolution of detection of the actual feed distance of the movable object where it is not necessary to control the actual distances of movement of the movable object with high accuracy. This arrangement permits a comparatively rapid movement of the movable object to each predetermined stop position corresponding to the target distance of movement, and a decrease in the load of the edge counter when the edges of the signal pulses are counted.

For instance, the threshold value above which the lowest degree of resolution of detection of the actual amount of motion is selected may be a predetermined value of the target amount of motion above which it is considered unnecessary to control the actual amount of motion of the movable object with high accuracy. For example, the threshold value may be equal to the width of a row of printing nozzles of the printing head from which droplets of an ink are delivered to form an image on the recording medium.

(7) An apparatus according to the above mode (6), wherein the movable object is one of a recording medium and a printing head in a printer wherein the printing head has a row of printing nozzles operable to deliver droplets of an ink to form an image on the recording medium and wherein the above-indicated one of the recording medium and the printing head is moved relative to the other by the electric motor, and wherein the resolution selector selects the lowest one of different degrees of the resolution of detection, when a target distance of movement of the movable object as the target amount of motion is larger than a length of the row of the printing nozzles.

In the motor control apparatus according to the above mode (7) wherein the resolution selector selects the lowest degree of the resolution of detection when the target distance of movement of the movable object is larger than the length of the row of the printing nozzles. This arrangement permits the movable object to be rapidly moved to the stop position represented by the target distance of movement, and makes it possible to reduce a load on the edge counter in its operation to count the edges of the signal pulses.

The row of the printing nozzles extends in the direction of movement of the recording medium where the printing is effected in the secondary scanning direction, or extends in the direction of movement of the printing head where the printing is effected in the primary scanning direction.

(8) An apparatus according to any one of the above modes (1)–(7), further comprising an actual-motion-amount detector operable to detect the actual amount of motion of the movable portion of the electric motor or the movable object, wherein the control-condition changing device includes (a) a target-motion-amount setter operable to set the target amount of motion of the movable portion of the electric motor or the movable object, and (b) a voltage setter operable to set the voltage to be applied to the electric motor, such that the voltage is changed depending upon the actual amount of motion set by the target-motion-amount setter, and wherein the feedback motor controller includes a pulse-width-modulation controller operable to control the electric motor such that the actual amount of motion detected by the actual-motion-amount detector coincides with the target amount of motion set by the target-motion-amount setter.

In the motor control apparatus according to the above mode (8), the voltage setter sets the voltage to be applied to the electric motor, such that the voltage is changed depending upon the target amount of motion of the movable portion of the electric motor or the movable object which is set by the target-motion-amount setter.

The actual-motion-amount detector detects the actual amount of motion of the movable portion of the electric motor or the movable object, and the pulse-width-modulation controller controls the electric motor such that the actual amount of motion detected by the actual-motion-amount detector coincides with the target amount of motion set by the target-motion-amount setter.

The motor control apparatus according to the above mode (8) wherein the voltage to be applied to the electric motor is changed depending upon the target amount of motion of the movable portion of the electric motor and the movable object, the voltage is set to be relatively low when the target amount of motion is relatively small, so that the duty ratio of a pulse-width-modulation signal used to control the electric motor can be changed in a relatively wide range even when the target amount of motion is relatively small. Accordingly, the operating speed of the electric motor or the movable object driven by the electric motor can be intricately controlled with high accuracy.

Thus, the motor control apparatus according to the above mode (8) makes it possible to control electric motor such that the actual amount of motion of the movable portion of the electric motor or the movable object accurately coincides with the target amount of motion, even when the target amount of motion is relatively small.

(9) An apparatus according to the above mode (8), wherein the voltage setter sets said voltage to be applied to the electric motor such that the voltage is lower when the target amount of motion is relatively small than when the target amount of motion is relatively large.

The motor control apparatus according to the above mode permits accurate control of the actual amount of motion to coincide with the target amount of motion even when the target amount is relatively small.

(10) An apparatus according to the above mode (8) or (9), wherein the voltage setter includes a data table memory storing a data table representative of a relationship between the target amount of motion and the voltage to be applied to the electric motor, and sets the voltage on the basis of the target amount of motion and according to the relationship.

(11) An apparatus according to the above mode (10), wherein the control-condition further includes (c) a peak-current estimator operable on the basis of the actual amount of motion detected by the actual-motion-amount detector, to estimate a maximum value of an electric current flowing through the electric motor during an operation of the electric motor for coincidence of the detected actual amount of motion with the target amount of motion set by the target-motion-amount setter, (d) a voltage calculator operable on the basis of the estimated maximum value of the electric current, to calculate a value of the voltage which is required for coincidence of an actual value of the electric current to coincide with the estimated maximum value of the electric current, and (e) a data-table updating device operable to update the data table by replacing a value of the voltage presently set in the data table for the target amount of motion set by the target-motion-amount setter, with the value of the voltage calculated by the voltage calculator.

The peak-current estimator is arranged to estimate the maximum value of the electric current flowing through the electric motor during its operation for coincidence of the actual amount of motion of the movable portion of the electric motor or the movable object with the target amount of motion, on the basis of the actual amount of motion detected by the actual-motion-amount detector. On the basis of the thus estimated maximum current value, the voltage calculator calculates the voltage value which is required for coincidence of the actual current value of the motor to coincide with the estimated maximum current value. The data-table updating device replaces the voltage value presently set in the data table for the target amount of motion set by the target-motion-amount setter, with the calculated voltage value.

In the motor control apparatus according to the above mode (11), the voltage value of the electric motor to apply thereto the estimated maximum current value required for moving the movable portion of the motor or the movable object to each stop position represented by each target amount of motion is calculated and set in the data table for each target amount of motion. Thus, the voltage value set in the data table for each target amount of motion is updated to an optimum value when the movable portion of the electric motor or the movable object is moved to the stop position represented by each target amount of motion, whereby the voltage to be applied to the electric motor is optimized so as to assure high accuracy of coincidence of the actual amount of motion with the target amount.

Since the data table represents the voltage value corresponding to the maximum current value for each target amount of motion, the duty ratio of the pulse-width-modulation signal to be applied to the electric motor can be controlled within a range between 0% and 100%, so that the speed of the movable portion of the electric motor or the movable object can be intricately controlled. The voltage value required for coincidence of the actual current value of the motor with the estimated maximum current value may be a voltage value for controlling the actual current value to slightly exceed the estimated maximum current value.

(12) An apparatus according to the above mode (11), wherein the peak-current estimator determines, as the maximum value of the electric current, a highest value of the electric current estimated according to a state-space equation which includes variable parameters representative of dynamic behaviors of said electric motor.

The peak-current estimator arranged as described above permits accurate estimation of the maximum value of the electric current flowing through the electric motor for each target amount of motion.

(13) An apparatus according to any one of the above modes (8)–(12), wherein the electric motor is a DC motor.

(14) An apparatus according to any one of the above modes (8)–(12), wherein the electric motor is a brushless motor.

(15) An apparatus according to the above mode (1), further comprising an actual-motion-amount detector operable to detect the actual amount of motion of the movable portion of the electric motor or the movable object, wherein the actual-motion-amount detector includes (i) a pulse generator operable to periodically generate signal pulses such that each of the signal pulses is generated each time the movable portion of the electric motor or the movable object is driven by a predetermined amount, and (ii) an edge counter operable to count the number of at least one of a rising edge and a falling edge of the signal pulses generated by the pulse generator, and wherein the control-condition changing device includes:

(a) a target-motion-amount setter operable to set the target amount of motion of the movable portion or the movable object;

(b) a resolution selector operable to select a degree of the resolution of detection of the actual amount of motion, depending upon the target amount of motion set by the target-motion-amount setter;

(c) a target-count calculator operable to calculate a target number of the edges of the signal pulses which corresponds to the target amount set by the target-motion-amount setter, on the basis of the degree of the resolution of detection selected by the resolution selector; and (d) a voltage setter operable to set the voltage to be applied to the electric motor, such that the voltage is changed depending upon the actual amount of motion set by the target-motion-amount setter, and wherein the feedback motor controller compares the number of the edges of the signal pulses counted by the edge counter with the target number of the edges calculated by the target-count calculator, and performs a feedback control of the electric motor for coincidence of the number of the edges of the signal pulses counted by the edge counter with the target number.

The motor control apparatus according to the above modes (15) has both of the advantages described above with respect to the above mode (2) and the advantages described above with respect to the above mode (8).

(16) A method of controlling an electric motor provided to drive a movable object such that a detected actual amount of motion of a movable portion of the electric motor or the movable object coincides with a target amount, comprising the steps of:

changing at least one of a resolution of detection of the actual amount of motion and a voltage to be applied to the electric motor, depending upon the target amount; and feedback-controlling the electric motor by application of the voltage, on the basis of the actual amount of motion detected with the resolution of detection and the target amount, such that the detected actual amount of motion coincides with the target amount.

The motor control method according to the above mode (16) of this invention has the same advantages as the motor control apparatus according to the above mode (1).

(17) A method according to the above mode (16), further comprising the step of counting the number of at least one of a rising edge and a falling edge of signal pulses which are periodically generated such that each of the signal pulses is generated each time the movable portion of the electric motor or the movable object is driven by a predetermined amount, wherein the step of changing at least one of a resolution of detection of the actual amount of motion and a voltage to be applied to the electric motor, depending upon the target amount comprises (a) setting the target amount of motion of the movable portion or the movable object, (b) selecting a degree of the resolution of detection of the actual amount of motion, depending upon the set target amount of motion, and (c) calculating a target number of the edges of the signal pulses which corresponds to the set target amount, on the basis of the selected degree of the resolution of detection, and wherein the step of feedback-controlling the electric motor comprises comparing the number of the edges of the counted signal pulses with the calculated target number of the edges, and performing a feedback control of the electric motor for coincidence of the counted number of the edges of the signal pulses with the calculated target number.

The motor control method according to the above mode (17) has the same advantages as the motor control apparatus according to the above mode (2).

(18) A method according to the above mode (17), wherein the step of selecting a degree of the resolution of detection of the actual amount of motion comprises selecting the degree of the resolution of detection of the actual amount of motion such that the selected degree of the resolution of detection is lower when the target amount of motion is relatively large than when the target amount of motion is relatively small.

The motor control apparatus according to the above mode (18) has the same advantages as the motor control apparatus according to the above mode (3).

(19) A method according to the above mode (17) or (18), wherein the step of selecting a degree of the resolution of detection of the actual amount of motion comprises selecting the degree of the resolution of detection, by selecting an edge-counting mode in which the edges of the signal pulses are counted, from among a first edge-counting mode in which only the rising edges of pulses of a first pulse signal are counted to establish a first degree of resolution, a second edge-counting mode in which the rising and falling edges of the pulses of the first pulse signal are counted to establish a second degree of resolution higher than the first degree of resolution, a third edge-counting mode in which the rising and falling edges of the pulses of the first pulse signal and the rising and falling edges of pulses of a second pulse signal having a predetermined phase difference with respect to the first pulse signal are counted to establish a third degree of resolution higher than the second degree of resolution.

The motor control method according to the above mode (19) has the same advantages as the motor control apparatus according to the above mode (4).

(20) An apparatus according to any one of the above modes (17)–(19), wherein said step of selecting a degree of the resolution of detection of the actual amount of motion comprises increasing said degree of the resolution of detection when the detected actual amount of motion has increased to an amount which is smaller by a predetermined amount than the target amount of motion set by the target-motion-amount setter.

The motor control method according to the above mode (20) has the same advantages as the motor control apparatus according to the above mode (5).

(21) A method according to any one of the above modes (16)–(20), wherein the step of changing at least one of a resolution of detection of the actual amount of motion and a voltage to be applied to the electric motor, depending upon the target amount comprises the step of changing the voltage depending upon said target amount.

The motor control method according to the above mode (21) has the same advantages as the motor control apparatus according to the above mode (8).

(22) A method according to the above mode (21), wherein the step of changing the voltage comprises changing the voltage such that the voltage is lower when the target amount of motion is relatively small than when the target amount of motion is relatively large.

The motor control method according to the above mode (22) has the same advantages as the motor control apparatus according to the above mode (9).

(23) A method according to the above mode (21) or (22), wherein the step of changing said voltage comprises storing a data table representative of a relationship between the target amount of motion and the voltage to be applied to the electric motor, and determining the voltage on the basis of the target amount of motion and according to the relationship.

The motor control method according to the above mode (23) has the same advantages as the motor control apparatus according to the above mode (10).

(24) A method according to the above mode (23), wherein the step of changing at least one of a resolution of detection of the actual amount of motion and a voltage to be applied to the electric motor, depending upon the target amount comprises: estimating a maximum value of an electric current flowing through the electric motor during an operation of the electric motor for coincidence of the detected actual amount of motion with the target amount of motion, on the basis of the detected actual amount of motion; calculating, on the basis of the estimated maximum value of the electric current, a value of the voltage which is required for coincidence of an actual value of the electric current to coincide with the estimated maximum value of the electric current; and updating the data table by replacing a value of the voltage presently set in the data table for the set-target amount of motion, with the calculated value of the voltage.

The motor control method according to the above mode (14) has the same advantages as the motor control apparatus according to the above mode (11).

(25) A method according to the above mode (16), further comprising the step of counting the number of at least one of a rising edge and a falling edge of signal pulses which are periodically generated such that each of the signal pulses is generated each time the movable portion of the electric motor or the movable object is driven by a predetermined amount, wherein the step of changing at least one of a resolution of detection of the actual amount of motion and a voltage to be applied to the electric motor, depending upon the target amount comprises changing both of the resolution of detection and the voltage, the step of changing comprising the steps of (a) setting the target amount of motion of the movable portion or the movable object, (b) selecting a degree of the resolution of detection of the actual amount of motion, depending upon the set target amount of motion, (c) calculating a target number of the edges of the signal pulses which corresponds to the set target amount, on the basis of the selected degree of the resolution of detection, and (d) changing the voltage depending upon the target amount, and wherein the step of feedback-controlling the electric motor comprises applying the changed voltage to the electric motor, comparing the number of the edges of the counted signal pulses with the calculated target number of the edges, and performing a feedback control of the electric motor for coincidence of the counted number of the edges of the signal pulses with the calculated target number.

The motor control method according to the above mode (25) has the same advantages as the motor control apparatus according to the above mode (15).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 12 is a view for explaining a data table stored in a memory used in the motor control apparatus of FIG. 10;

DETAILED DESCRIPTION OF THE PREFERRED EMBODIMENTS

Preferred embodiments of the present invention will be described by reference to the accompanying drawings. Referring first to FIGS. 1–6, there will first be described a motor control apparatus according to a first embodiment of the invention as applied to a paper-feeding electric motor in the form of a line feed motor 20 (hereinafter referred to as "LF motor 20") which is provided to activate a paper feeding mechanism of a printer 1, for feeding a sheet of paper (or a web of paper).

<First Embodiment>

Figure 1:
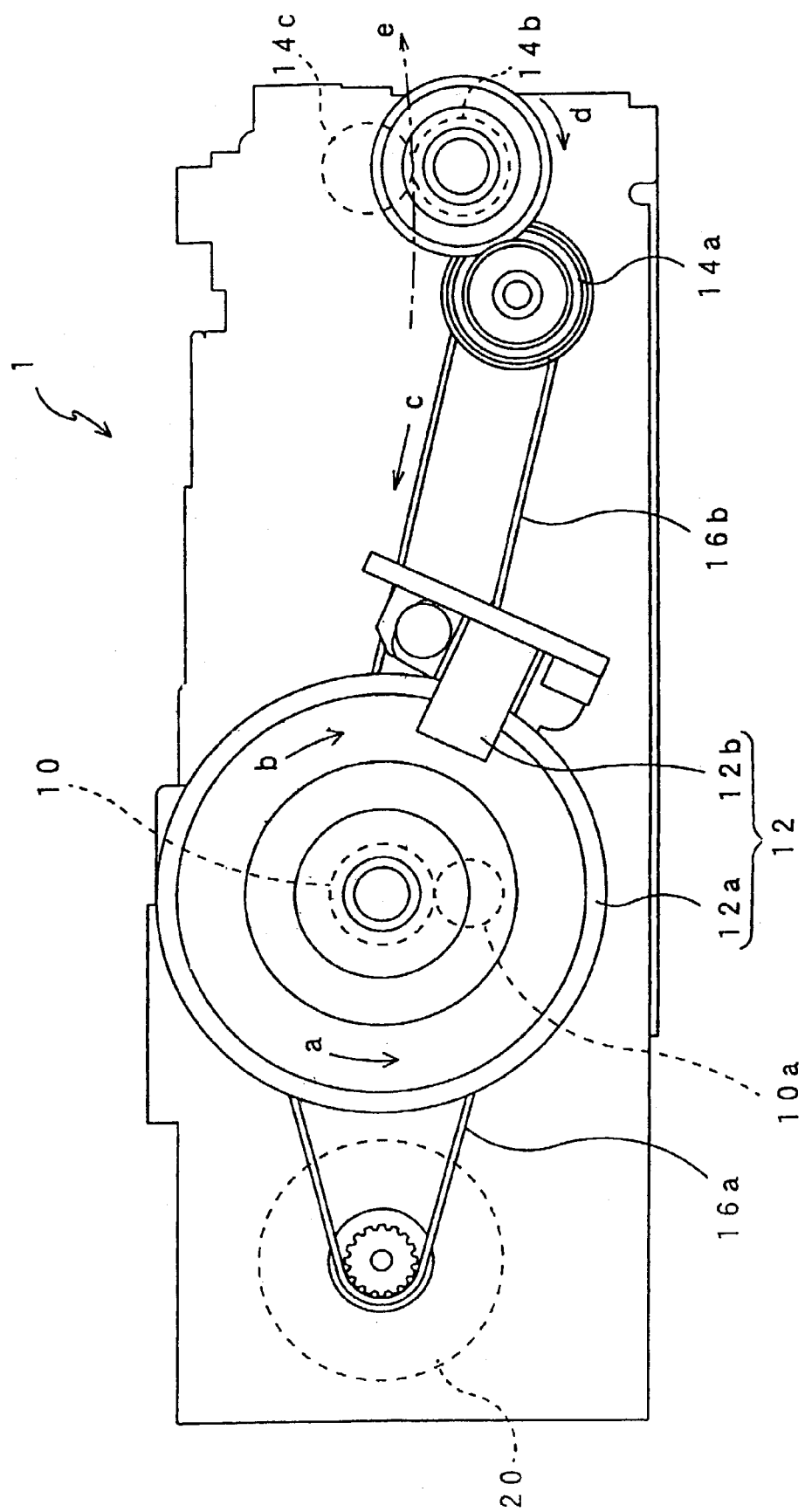
FIG. 1 is a side elevational view of a paper feeding mechanism of a printer, which includes an electric motor controlled by a motor control apparatus.

As shown in FIG. 1, the paper feeding mechanism of the printer 1 includes a paper feeding roller or a rotary body in the form of a main roller 10, a rotary encoder 12 (hereinafter referred to simply as "encoder 12") operable to detect an angular position or rotary motion of the main roller 10, an eject roller 14b, and the above-indicated LF motor 20. The main roller 10 is a movable object operable by the LF motor 20.

Figure 2:
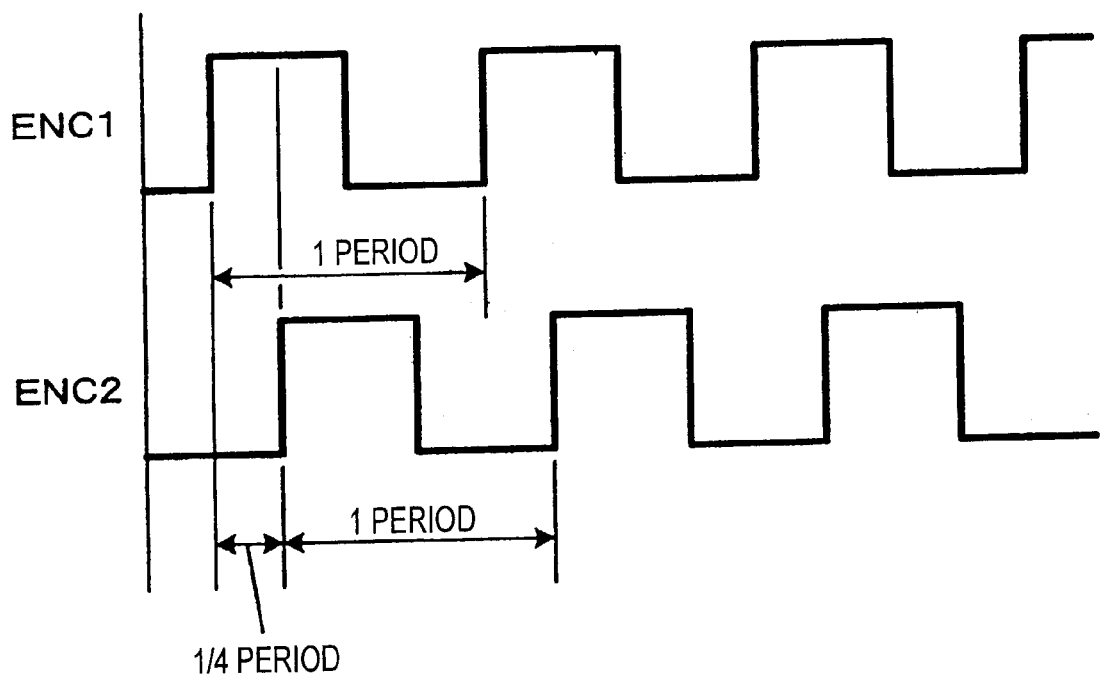
FIG. 2 is a view showing encoder signals generated by an encoder used by the motor control apparatus.

The encoder 12 includes a rotary disc 12a rotatable with the main roller 10, and a photo-interrupter 12b arranged to detect an angular position of the rotary disc 12a. The rotary disc 12a has a multiplicity of radial slits equally spaced apart from each other in its circumferential direction. The photo-interrupter 12b, which is disposed adjacent to the rotary disc 12a, includes one light-emitting element located on one side of the rotary disc 12a, and two light-sensitive elements located on the other side of the rotary disc 12a such that the two light-sensitive elements are opposed to the light-emitting element. This encoder 12 is arranged to generate two encoder signals ENC1 and ENC2 having a phase difference equal to a quarter of the period, as indicated in FIG. 2, each time the rotary disc 12a has been rotated by a predetermined incremental angle to feed the sheet of paper by a predetermined distance of 1/1500 inch (about 0.0017 cm). The encoder signal ENC1 is used to detect the angular position of the main roller 10, while the encoder signal ENC 2 is used to detect a rotating direction of the main roller 10. In the present embodiment, however, the encoder signal ENC2 also functions to cooperate with the encoder signal ENC1 to detect the angular position of the main roller 10, namely, a distance of movement of the sheet of paper.

Described in detail, each of the encoder signals ENC1 and ENC2 is generated in the form of rectangular pulses during rotation of the rotary disc 12a with the main roller 10, such that the period of generation of the signal pulses corresponds to a predetermined distance of movement of 1/1500 inch of the paper sheet by the main roller 10. A time interval between rising and falling edges of each pulse of the encoder signal ENC1, ENC2 corresponds to a distance of movement of 1/3000 inch of the paper sheet by the main roller 10. Further, a time interval between the rising edge (or the falling edge) of each pulse of the encoder signal ENC1 and the rising edge (or the falling edge) of the corresponding subsequent pulse of the encoder signal ENC2 corresponds to a distance of movement of 1/6000 inch of the paper sheet by the main roller 10.

The LF motor 20 is provided to rotate the main roller 10 and the rotary disc 12a through a drive pulley (not shown) directly connected to the main roller 10 and a belt 16a which connects the LF motor 20 and the drive pulley. The LF motor 20 is used to also rotate the eject roller 14b through a belt 16b connected to a drive pulley and an idler gear 14a connected to the belt 16b. In FIG. 1, arrows "a" and "b" indicate the forward and reverse rotating directions of the main roller 10, respectively, and arrows "c" and "d" indicate the rotating directions of the belt 16b and the eject roller 14b, respectively, when the main roller 10 is rotated in the forward direction. Pinch rollers 10a are held in pressing contact with the main roller 10, while spur wheels 14c are held in pressing contact with the eject roller 14b. The sheet of paper is fed in the forward direction while it is passed through a nip between the main roller 10 and the pinch rollers 10a. A printing operation is performed to print an image on the sheet of paper, in a portion of a feed path of the sheet located between the main roller 10 and the eject roller 14b. The sheet of paper is ejected out of the printer 1 in a direction indicated by an arrow "e" in FIG. 1, while the sheet is passed through a nip between the eject roller 14a and the spur wheels 14c. When the LF motor 20 is operated in its forward direction, the main roller 10 is rotated in the forward direction (indicated by the arrow "a" in FIG. 1) to advance the sheet of paper in the forward direction from the main roller 10 toward the eject roller 14b.

The printer 1 includes: a CPU (central processing unit) 30 operable to control the printer 1 as a whole; a memory 32 (including a ROM and a RAM) for storing various programs executed by the CPU 30 and for temporarily storing results of arithmetic operations performed by the CPU 30; a resolution selector switch 34 used to select a FINE printing mode for printing an image with a relatively high resolution, or a DRAFT mode for printing an image with a relatively low resolution; an input-output interface 36 through which the CPU 30 is connected to a terminal device such as a computer system, through a suitable interface such as a USB (Universal Serial Bus); a motor driver circuit 40 operable to drive the LF motor 20, and a signal generator circuit 100 operable to generate a PWM signal (pulse-width modulation signal) to be applied to the motor driver circuit 40. It will be understood that the CPU 30, memory 32, switch 34, input-output interface 36, motor driver circuit 40 and signal generator circuit 100 constitute a major portion of the motor control apparatus according to the present embodiment.

The present motor control apparatus including the CPU 30 is arranged to execute a control routine (described below by reference to the flow chart of FIG. 4) for controlling the LF motor 20 to feed the paper sheet, upon reception of printing data through the input-output interface 36. The printing data include feed-distance data representative of a plurality of target distances (#1 to #n distance values) of feeding movements of the paper sheet.

The signal generator circuit 100 is a so-called ASIC (Application Specific Integrated Circuit), which includes: a register array 110 provided to store various parameters used for controlling the LF motor 20; a paper feed monitor 120 operable to monitor the condition of feeding of the sheet of paper, on the basis of the encoder signals received from the encoder 12; a signal generator 130 operable to generate a control signal for controlling the LF motor 20; a signal converter 140 operable to convert the control signal generated by the signal generator 130 into a PWM signal; and a clock generator 150 operable to generate clock pulses to be supplied to the various portions of the signal generator circuit 100. The clock generator 150 is arranged to generate the clock pulses whose period is shorter than the minimum period of the encoder signals generated by the encoder 12.

Figure 5:
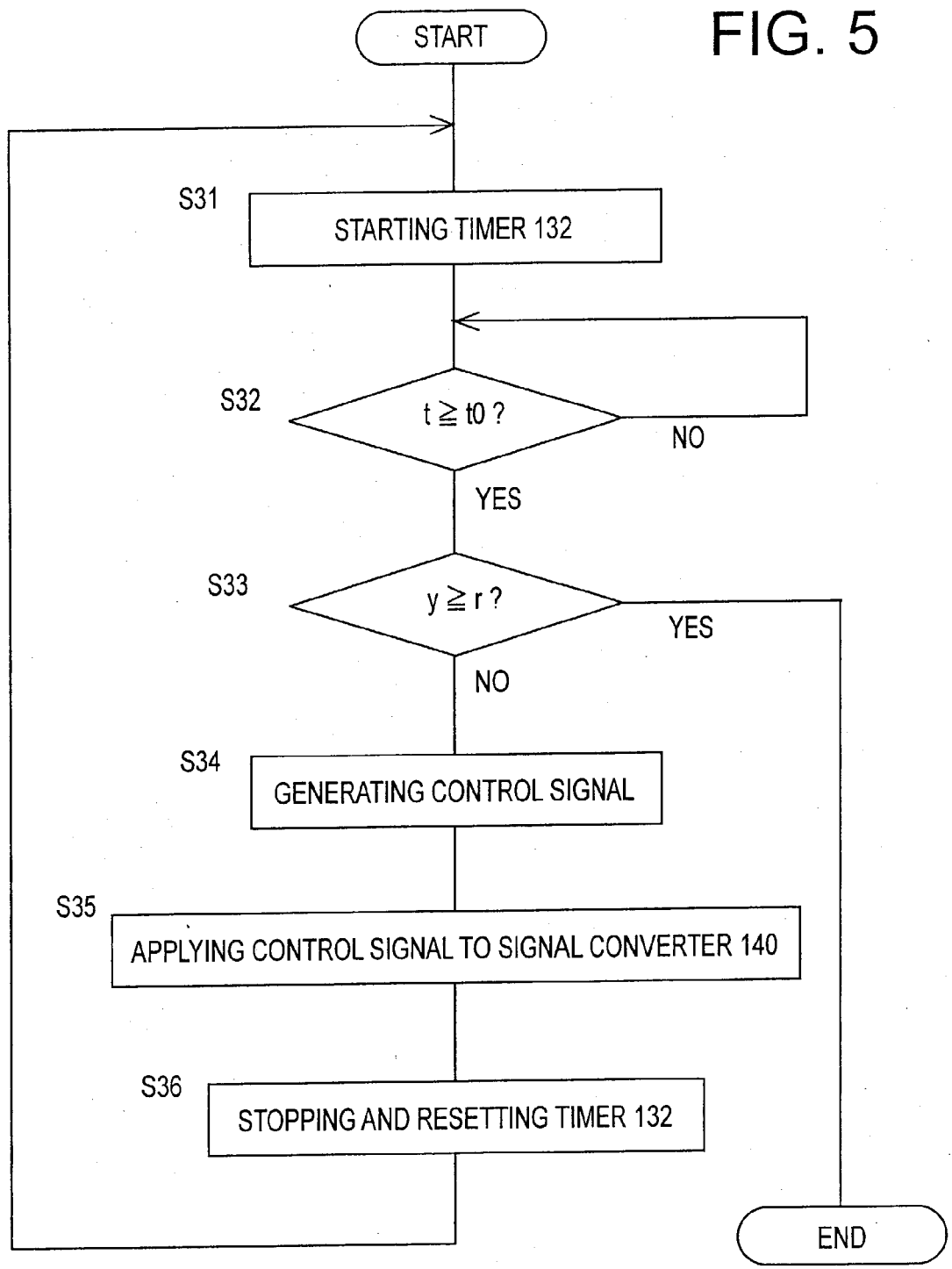
FIG. 5 is a flow chart illustrating a part control routine executed by a signal generator circuit of the motor control apparatus to generate a control signal for controlling the electric motor.

The register array 110 includes: a start setting register 111 for starting the signal generator circuit 100: a timing setting register 112 for storing a computing time t0 indicative of a moment at which the control signal is generated according to a control routine illustrated in the flow chart of FIG. 5; a target-value register 113 for storing a target value r of the number of the encoder signal pulses which indicates a desired feed distance of the paper sheet; an effective-edge register 114 for storing a value indicative of selected edges of the pulses of the encoder signals ENC1 and ENC2, which selected edges are used to detect an actual feed distance of the paper sheet; a first-gain register 115 for storing an integral gain F1 used by the signal generator 130 to generate the control signal; and a second-gain register 116 for storing a state-feedback gain F2. The start setting register 111 is provided to store various commands written to start the signal generator circuit 100.

The paper feed detector 120 includes: a detecting portion 121 operable to detect the selected edges of the encoder signal pulses, which edges are indicated by the effective-edge register 114, as described below in detail; a counter 122 operable to count the number of the edges of the encoder signal pulses, which edges are detected by the detecting portion 121; and an interruption control portion 123 operable to apply an interruption signal to the CPU 30 at a moment when a count y of the counter 122 has reached a value corresponding to the desired feed distance of the paper sheet as represented by the target value r set in the target-value register 113, or at a moment a predetermined time after the above-indicated moment. The detecting portion 121 determines that the main roller 10 is rotated in the forward direction, if the encoder signal ENC1 falls while the encoder signal ENC2 is in the high state, and determines that the main roller 10 is rotated in the reverse direction, if the encoder signal ENC1 rises while the encoder signal ENC2 is in the low state. The counter 122 counts the number of the selected edges of the encoder signal pulses in the incrementing direction, when the detecting portion 121 determines that the main roller 10 is rotated in the forward direction, and in the decrementing direction when the detecting portion 121 determines that the main roller 10 is rotated in the reverse direction.

Figure 8:
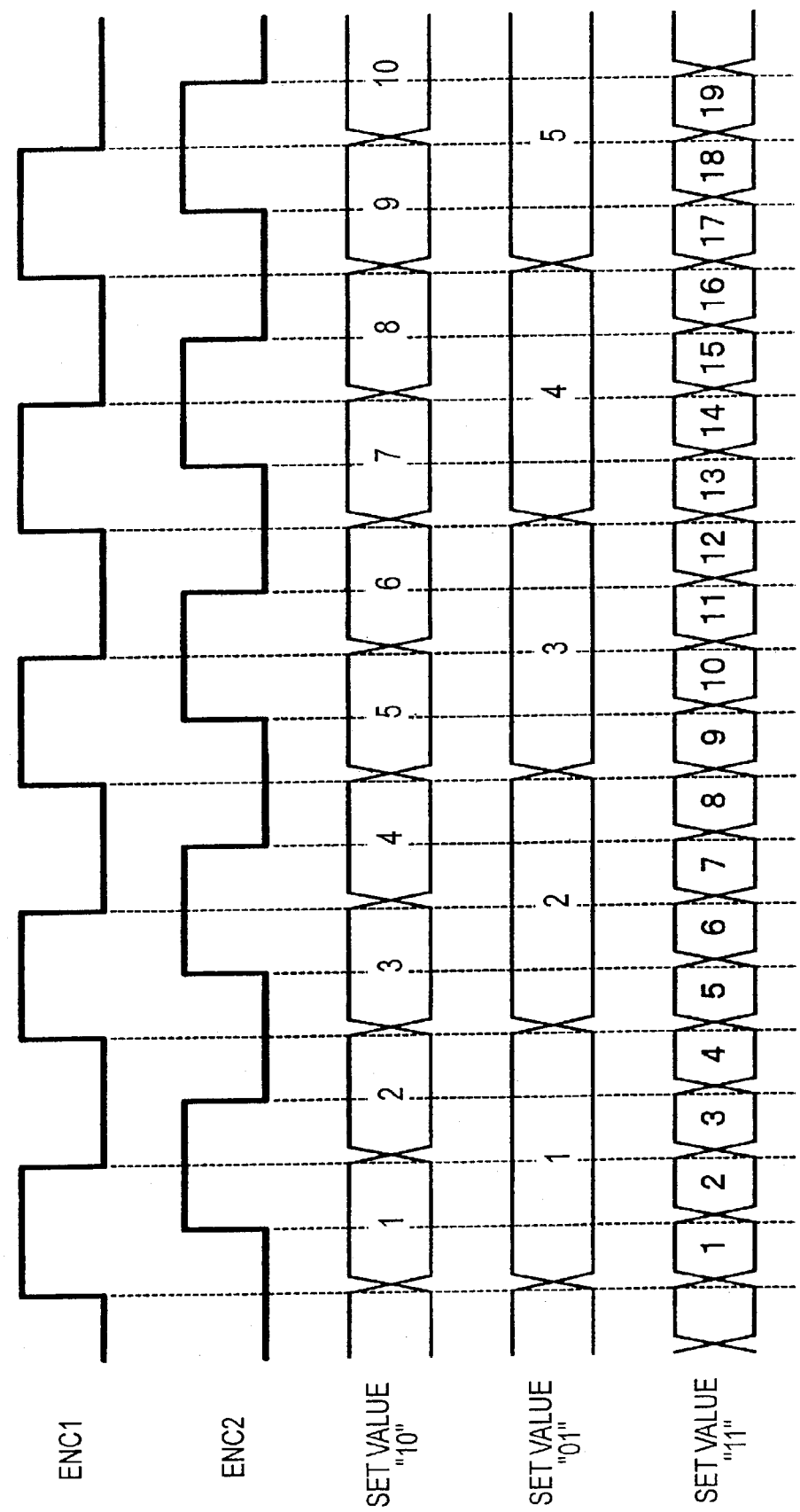
FIG. 8 is a view depicting three different manners in which pulses of the encoder signals are counted by a counter provided in the motor control apparatus.

The detecting portion 121 detects only the rising edges of the pulses of the encoder signal ENC1, when the value set in the effective-edge register 114 is "01", as indicated in FIG. 8. In this case, the counter 122 increments the count y each time the paper sheet has been fed by the main roller 10 by a distance of $1/1500$ inch, if the main roller 10 is rotated in the forward direction. When the value set in the effective-edge register 114 is "10", the detecting portion 121 detects both of the rising and falling edges of the encoder signal ENC1, as also indicated in FIG. 8. In this case, the counter 122 increments the count y each time the paper sheet has been fed by the main roller 10 by a distance of $1/3000$ inch. When the value set in the effective-edge register 114 is "11", the detecting portion 121 detects both of the rising and falling edges of the pulses of both of the encoder signals ENC1 and ENC2. In this case, the counter 122 increments the count y each time the paper sheet has been fed by a distance of $1/6000$ inch. Thus, the actual distance of feeding movement of the paper sheet by the main roller 10 driven by the LF motor 20 can be detected with a selected one of three different values of resolution, depending upon the value set in the effective-edge register 114. Namely, the actual feed distance of the paper sheet is detected in low-, medium- and high-resolution modes when the values "01", "10" and "11" are set in the effective-edge register 114, respectively.

The signal generator 130 includes: a computing portion 131 operable to generate the control signal for controlling the LF motor 20; and a timer 132 operable to measure a time on the basis of the clock pulses generated by the clock generator 150. In addition to the counter 122, a cumulative counter (not shown in FIG. 3) is provided to count the rising and falling edges of the pulses of the encoder signals ENC1, ENC2, at the same timing as the counter 122 when the value "11" is set in the effective-edge register 114. The cumulative counter counts the edges after the leading edge of a recording medium in the form of the paper sheet is detected, and until the paper sheet is ejected from the printer 1.

<Operation of CPU 30 to Control Paper Feeding>

Referring to the flow chart of FIG. 4, there will be described a control routine executed by the motor control apparatus including the CPU 30, to control the LF motor 20 for feeding the paper sheet. This control routine is initiated when the CPU 30 receives printing data through the input-output interface 36.

Figure 4:
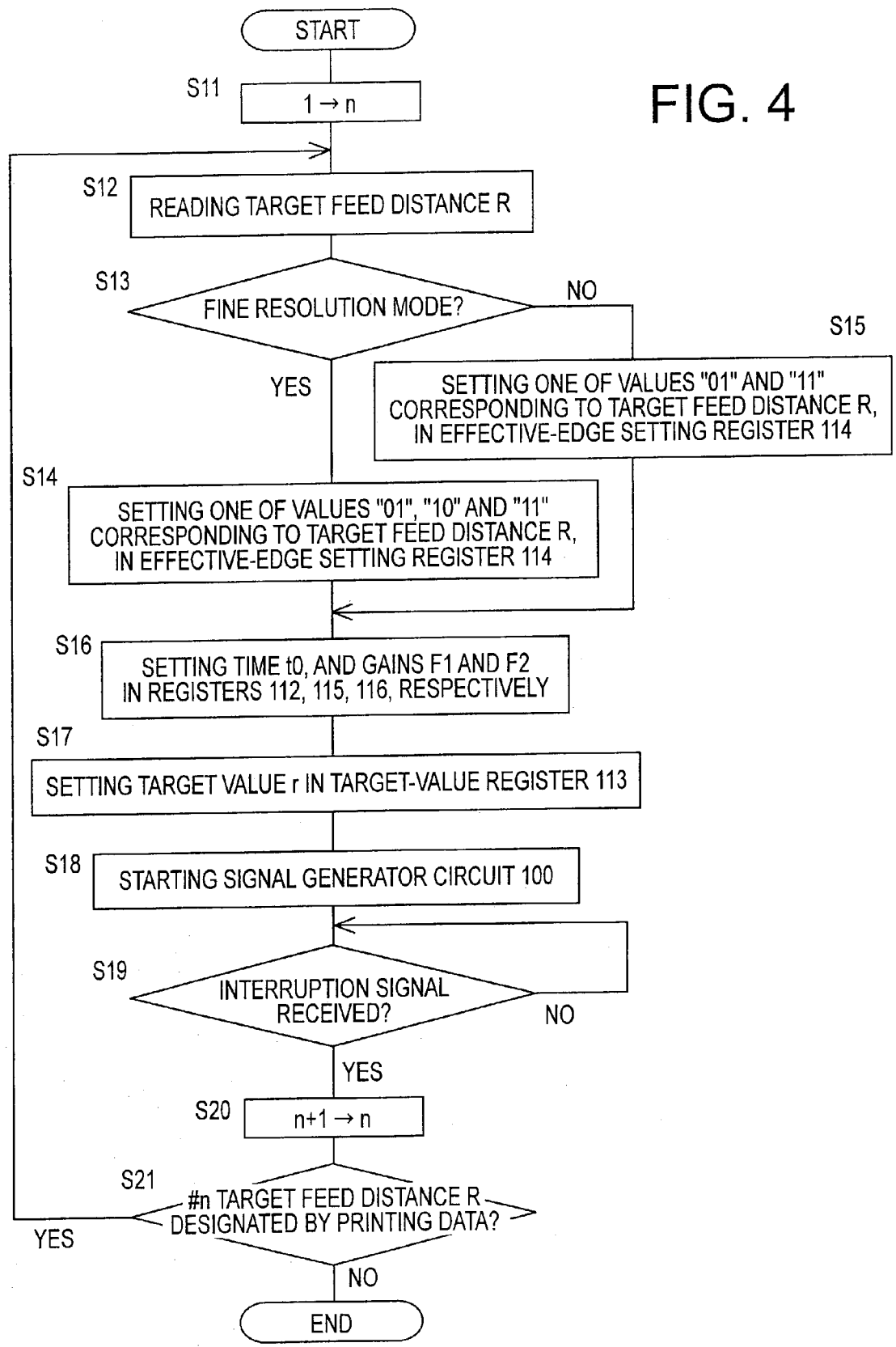
FIG. 4 is a flow chart illustrating a control routine executed by the motor control apparatus of FIG. 3 for controlling the electric motor of the paper feeding mechanism of FIG. 1 to feed a sheet of paper.

The control routine of FIG. 4 is initiated with step S11 in which the CPU 330 performs an initializing operation wherein a variable "n" is incremented to "1". The variable "n" represents the identification number of a presently selected target feed distance R of the paper sheet. Initially, the variable "n" is set at "1" to select a #1 value of a target feed distance R.

Then, the control flow goes to step S12 to read a #n value of the target feed distance R represented by the feed-distance data included in the received printing data. That is, one of a plurality of target feed distances R represented by the feed-distance data is read according to the variable "n". When step S12 is implemented for the first time, the CPU 30 reads the #1 value of the target feed distance R, which corresponds to the variable "n" presently set at "1".

The control flow then goes to step S13 to determine whether the FINE printing mode in which an image is printed with a high degree of resolution is presently selected by the resolution selector switch 34. As described above, the resolution selector switch 34 is provided to select the FINE printing mode or the DRAFT printing mode in which an image is printed with a low degree of resolution.

When the FINE printing mode is selected by the resolution selector switch 34, that is, when an affirmative decision (YES) is obtained in step S13, the control flow goes to step S14 in which the CPU 30 sets an appropriate one of the three values "01", "10" and "11" in the effective-edge register 114. In step S13, the CPU 30 first compares the target feed distance R of the paper sheet read in step S12, with threshold values of 1 inch and $1/16$ inch, and sets the value "01" in the effective-edge register 114 if the target feed distance R is larger than 1 inch. The CPU 30 sets the value "10" in the effective-edge register 114 if the target feed distance R is larger than $1/16$ inch and smaller or equal to 1 inch, and sets the value "11" in the effective-edge register 114 if the target feed distance R is equal to or smaller than $1/16$ inch. Thus, the value set in the effective-edge register 114 is determined depending upon the target feed distance R, such that as the target feed distance R decreases, the number of the edges of the pulses of the encoder signals ENC1, ENC2 counted by the counter 122 is increased to increase the resolution of detection of the actual feed distance of the paper sheet by the paper feed monitor 120. That is, the resolution of detection of the actual feed distance is increased with a decrease in the target feed distance R.

When the DRAFT printing mode is selected by the resolution selector switch 34, that is, when a negative decision (NO) is obtained in step S13, the control flow goes to step S15 in which the CPU 30 sets an appropriate one of the two values "01" and "11" in the effective-edge register 114. In step S15, the CPU 30 sets the value "01" in the effective-edge register 114 if the target feed distance R is larger than 1 inch, and sets the value "11" in the effective-edge register 114 if the target feed distance R is equal to or smaller than $1/16$ inch. Like step S14, step S15 is formulated to increase the resolution of detection of the actual feed distance of the paper sheet with a decrease in the target feed distance R.

Step S14 or S15 is followed by step S16 in which the CPU 30 sets the computing time t0, integral gain F1 and state-feedback gain F2 in the timing setting register 112, first-gain register 115 and second-gain register 116 of the register array 110, respectively. The absolute values of the gains F1 and F2 to be set in the respective first-gain and second-gain registers 115, 116 are increased with an increase in the target feed distance R.

Then, step S17 is implemented by the CPU 30 to set the target value r in the target-value register 113 of the register array 110. The target value r to be set in the target-value register 113 in this step S17 is calculated on the basis of the value set in the effective-edge register 114.

Described in greater detail, if the value "01" is set in the effective-edge register 114, the target value r is calculated as $R/(1/1500)$, by dividing the target feed distance R by $1/1500$ inch. If the value "10" is set in the register 114, the target value r is calculated as $R/(1/3000)$, by dividing the target feed distance R by $1/3000$ inch. If the value "11" is set in the register 114, the target value r is calculated as $R/(1/6000)$, by dividing the target feed distance R by $1/6000$ inch. It is noted that a change of the target feed distance R does not cause a considerable amount of change in the target value r to be set in the target-value register 113, since the denominator ($1/1600$;

1/3000; and 1/6000) decreases with a decrease in the target feed distance R which is the numerator.

Then, the control flow goes to step S18 in which the CPU 30 starts the signal generator circuit 100, by setting appropriate parameters in the start setting register 111 of the register array 110.

The signal generator circuit 100 which has been started in step S18 is operated to generate the control signal according to a control routine illustrated in the flow chart of FIG. 5, as described below. The generated control signal is applied to the motor driver circuit 40 through the signal converter 140, so that the LF motor 20 is activated to initiate a feeding movement of the paper sheet. When the actual feed distance of the paper sheet as detected by the paper feed monitor 120 has reached the target feed distance R, as a result of repeated application of the control signal to the motor driver circuit 40, the interruption control portion 123 generates the interruption signal.

Step S18 is followed by step S19 in which the CPU 30 determines whether the interruption signal has been generated by the interruption control portion 123. As long as the interruption signal has been generated, that is, as long as a negative decision (NO) is obtained in step S19, the control signal is applied to the motor driver circuit 40 for continuing a feeding movement of the paper sheet. When the interruption signal has been generated, that is, when an affirmative decision (YES) is obtained in step S19, the control flow goes to step S20 to increment the above-indicated variable "n" for selecting the next target feed distance R.

Step S20 is followed by step S21 in which the CPU 30 determines whether the feed-distance data representative of the next target feed distance R indicated by the variable "n" are included in the received printing data. If an affirmative decision (YES) is obtained in step S21, the control flow returns to step S12, so that steps S12–S21 are repeatedly implemented, until the LF motor 20 is operated to feed the paper sheet for all of the target feed distances represented by the feed-distance data included in the received printing data. If the printing data do not include feed-distance data representative of the next (#n) target feed distance R, a negative decision (NO) is obtained in step S21, and the execution of the control routine of FIG. 4 is terminated.

<Generation of Control Signal by Signal Generator 130>

The operation of the signal generator 130 to generate the control signal will be described by reference to the flow chart of FIG. 5. The control routine of FIG. 5 is initiated when the parameters for starting the signal generator circuit 100 have been set in the start setting register 111. While the signal generator circuit 100 is a hardware (so-called Application Specific Integrated Circuit), the operation of this hardware will be explained by describing events of operation performed by the hardware, by reference to the flow chart of FIG. 5, for easier understanding of the function of the signal generator 130.

The control routine of FIG. 5 is initiated with step S31 to start the timer 132 for measuring a time t. Then, the control flow goes to step S32 to determine whether the time t measured by the timer 132 has reached the computing time t0 set in the timing setting register 112. Step S32 is repeatedly implemented until the time t has reached the computing time t0.

If the computing time t0 has passed, that is, if an affirmative decision (YES) is obtained in step S32, the control flow goes to step S33 to determine whether the detected actual distance of feeding movement of the paper sheet has reached the target feed distance R. Namely, the count y of the counter 122 is compared with the target value r. If the count y is smaller than the target value r, this means that the actual feed distance has not reached the target feed distance R, and a negative decision (NO) is obtained in step S33. If the count y is equal to or larger than the target value r, this means that the actual feed distance has reached the target feed distance R, and an affirmative decision (YES) is obtained in step S33.

If the negative decision (NO) is obtained in step s33, the control flow goes to step S34 in which the computing portion 131 of the signal generator 130 generates the control signal to be applied to the motor driver circuit 40. The manner in which the computing portion 131 generates the control signal will be described by reference to the block diagram of FIG. 6.

Then, the control flow goes to step S35 in which the signal generator 130 applies the generated control signal to the signal converter 140, which converts the received control signal into the PWM signal and applies the PWM to the motor driver circuit 40.

Then, the control flow goes to step S36 in which the signal generator 130 stops and resets the timer 132. The control flow then goes back to step S31.

With steps S31–S36 being repeatedly implemented, the actual feed distance of the paper sheet has reached the target feed distance R, and the affirmative decision (YES) is obtained in step S33, whereby the control routine of FIG. 5 is terminated.

<Generation of Control Signal by Computing Portion 131>

The operation of the computing portion 131 to generate the control signal will be described referring to the block diagram of FIG. 6. The computing portion 131 of the signal generator 130 is arranged to effect a feedback control of a control input u to the signal converter 140, such that the count y of the counter 122 coincides with the target value r set in the target-value register 113. The computing portion 131 includes a first adder add1, an integrator int, a first-gain multiplier g1, a state estimator obs, a second-gain multiplier g2 and a second adder add2.

In the computing portion 131, the first adder add1 initially calculates an error (r−y) between the target value r set in the target-value register 113 and the count y of the counter 122. Then, the integrator int effects discrete integration (Z-transform) of the error (r−y) calculated by the first adder add1, by the sampling Ts set in the timing setting register 112, to calculate an integral $(Ts/z-1)(r-y)$ of the error (r−y), wherein "z" represents a complex variable.

Then, the first-gain multiplier g1 generates a first control signal having a value $u1 = -F1 \cdot (Ts/(z-1)(r-y)$, which is a product of the integral $(Ts/z-1)(r-y)$ calculated by the integrator int and the integral gain F1 set in the first-gain register 115.

In the meantime, the state estimator obs estimates a state quantity x representative of the internal state of the paper feeding mechanism, on the basis of the control input u to the signal converter 140 and the count y of the counter 122.

Then, the second-gain multiplier g2 generates a second control signal having a value $u2 = -F2 \cdot x$, which is a product of the state quantity x estimated by the state estimator obs and the state-feedback gain F2 set in the second-gain register 116.

The second adder add2 generates the control signal having the control input u which is equal to a sum of the value u1 of the first control signal and the value u2 of the second control signal.

With the thus generated control signal having the control input u applied to the signal converter 140, the PWM signal generated by the signal converter 140 according to the control signal causes the LF motor 20 to be operated in the direction determined by the control input u and at the angular velocity also determined by the control input u, so that the main roller 10 and the idler gear 14a are rotated. When the control input u is a positive value, the LF motor 20 increases the angular velocity of the main roller 10 in the forward direction (indicated by the arrow "a" in FIG. 1) by an amount corresponding to the absolute value of the control input u. When the control input u is a negative value, the LF motor 20 increases the angular velocity of the main roller 10 in the reverse direction (indicated by the arrow "b" in FIG. 1), namely, reduces the angular velocity in the forward direction, by an amount corresponding to the absolute value of the control input u.

<Advantages of the First Embodiment>

In the printer 1 provided with the motor control apparatus arranged as described above according to the first embodiment of this invention, the value "01", "10" or "11" which corresponds to the specific target feed distance R of the paper sheet is set in the effective-edge register 114 in step S14 or S15 of the control routine of FIG. 4. As described above, the value set in this register 114 indicates the edges of the pulses of the encoder signals ENC1, ENC2 which are counted by the counter 122 to detect the actual distance of feeding movement of the paper sheet by the main roller 10 rotated by the LF motor 20. That is, the number of the edges of the encoder signal pulses per unit feed distance of the paper sheet is increased with a decrease in the target feed distance R. Accordingly, the minimum incremental distance of feeding movement of the paper sheet that can be detected by the paper feed monitor 120 is increased to reduce the resolution of detection of the actual feed distance, as the target feed distance R increases. Conversely, the minimum incremental distance of feeding movement is reduced to increase the resolution of detection of the actual feed distance, as the target feed distance R decreases. Accordingly, the count y of the counter 122 per unit feed distance of the paper sheet will not considerably change with a change in the target feed distance R. Thus, the actual feed distance of the paper sheet is not detected with a relatively high degree of resolution when the target feed distance R is relatively large. Therefore, the present motor control apparatus does not require the counter 122 and the various arithmetic elements of the computing portion 131 (serving as the arithmetic unit) to have a large memory area even when the target feed distance R is relatively large. Further, since the count y of the counter 122 will not considerably change with a change in the target feed distance R, the arithmetic elements of the computing portion 131 would not have a heavy load of processing for the feedback control of the LF motor 20, even when the target feed distance R is relatively large. Since the count y of the counter 122 will not considerably change with the target feed distance R, the efficiency of utilization of the memory areas of the counter 122 and the arithmetic elements of the computing portion 131 would not be considerably lowered even when the target feed distance R is considerably large.

In addition, the present motor control apparatus makes it possible to select an appropriate one of the low, medium and high degrees of resolution of detection of the actual feed distance of the paper sheet, by setting one of the values "01", "10" and "11" in the effective-edge register 114, depending upon the target feed distance R, in step S14 or S15 of the control routine of FIG. 4.

<Second Embodiment>

There will be described a motor control apparatus according to a second embodiment of this invention, which is also applicable to the printer 1 described above with respect to the first embodiment.

<Operation of CPU 30 to Control Paper Feeding>

Referring to the flow chart of FIG. 7, there will be described a control routine executed by the CPU 30 of the motor control apparatus according to the second embodiment. This control routine is initiated with step S41 in which the CPU 30 increments the variable "n".

Then, the control flow goes to step S42 to read the target feed distance R which is represented by feed-distance data included in the received printing data and which corresponds to the variable "n" incremented in step S41. Then, the control flow goes to step S43 to set the value "01" in the effective-edge register 114. Since the value "01" represents the low resolution of detection of the actual feed distance of the paper sheet, the count y of the counter 122 per unit feed distance is the smallest.

Step S44 is then implemented to set the computing time t0, and the integral gain F1 and the state-feedback gain F2 in the timing setting register 112 and first-gain and second-gain registers 115, 116 of the register array 110, respectively, as in step S16 of the flow chart of FIG. 4 according to the first embodiment.

The control flow then goes to step S45 to set the target value r in the target-value register 113 of the register array 110. In this step S45, the target value r is calculated by subtracting a predetermined distance d from the target feed distance R, and dividing a thus obtained difference (R−d) by $\frac{1}{1500}$ inch. The thus calculated target value r=(R−d)/($\frac{1}{1500}$) is set in the target-value register 114. The predetermined distance d is a relatively small distance between a stop position of the paper sheet corresponding to the target feed distance R, and a resolution-changing position of the paper sheet which is spaced from the stop position in the reverse feeding direction of the paper sheet and at which the resolution of detection of the actual feed distance of the paper sheet is changed, more precisely, increased in step S48 which will be described below. The distance d may be a predetermined fixed value, or may be a variable which changes with the target feed distance R, such that the variable is 10% of the target feed distance R, for example.

Step 45 is followed by step S46 in which a count Y1 of the cumulative counter which represents the present longitudinal position of the paper sheet is temporarily stored in the memory 32, and the signal generator circuit 100 is started in the same manner as in step S18 in the first embodiment.

The control flow then goes to step S47 to determine whether the interruption signal has been generated by the interruption control portion 123, that is, whether the count y of the counter 122 has reached the target value r=(R−d)/($\frac{1}{1500}$) set in the target-value register 113 in step S45, namely, whether the paper sheet has been fed to the above-indicated resolution-changing position. The signal generator circuit 100 is held operated until the interruption signal has been generated, that is, as long as a negative decision (NO) is obtained in step S47. When the interruption signal has been generated, that is, when an affirmative decision (YES) is obtained in step S47, this means that the resolution-changing position of the paper sheet has been reached, and the control flow goes to step S48 to temporarily store a count Y2 of the cumulative counter in the memory 32, and set the value "11" in the effective-edge register 114. As a result, the count y of the counter 122 per unit feed distance of the paper sheet is maximized by minimizing the incremental feed distance of the paper sheet that can be detected by the paper feed monitor 120, so that the actual feed distance is detected with the highest degree of resolution. Thus, the resolution of detection of the actual feed distance is changed to the highest value when a distance between the present longitudinal position of the paper sheet and the stop position corresponding to the target feed distance R has been reduced to the predetermined distance d, that is, when the resolution-changing position corresponding to the distance (R−d) has been reached.

Step S49 is then implemented by the CPU 30 to change the integral gain F1 and the state-feedback gain F2 set in the first-gain and second-gain registers 115, 116, depending upon the predetermined value d. Namely, the absolute values of the gains F1 and F2 are changed to meet the distance d.

Step S49 is followed by step S50 to change or update the target value r set in the target-value register 113. That is, the updated target value r is calculated by dividing the target feed distance R read in step S42 by 1/6000 inch, and subtracting from the thus obtained quotient R(1/6000) a difference (Y2−Y1) between the counts Y2 and Y1 of the cumulative counter. The thus updated target value r=[R(1/6000)−(Y2−Y1)] is set in the target-value register 113. It will be understood that the count Y1 stored in step S46 represents the longitudinal position of the paper sheet at which the feeding movement of the paper sheet was initiated, while the count Y2 stored in step S48 represents the resolution-changing position of the paper sheet which corresponds to the distance (R−d) and at which the resolution of detection of the actual feed distance is changed from the low value "01" to the high value ("11").

Then, the control flow goes to step S51 to re-start the signal generator circuit 100, as in step S46. Step S51 is followed by step S52 to determine whether the interruption signal has been generated by the interruption control portion 123 of the paper feed monitor 120, that is, whether the total actual feed distance of the paper sheet has become equal to the original target feed distance R, that is, whether the paper sheet has reached the stop position. The signal generator circuit 100 is held operated until the interruption signal has been generated, or as long as a negative decision (NO) is obtained in step S52. When the interruption signal has been generated, that is, when an affirmative decision (YES) is obtained in step S52, the control flow goes to step S53 to increment the variable "n".

Then, the control flow goes to step S54 to determine whether the feed-distance data representative of the next target feed distance R indicated by the variable "n" are included in the received printing data. If an affirmative decision (YES) is obtained in step S54, the control flow returns to step S41, so that steps S41–S54 are repeatedly implemented, until the LF motor 20 is operated to feed the paper sheet for all of the target feed distances represented by the feed-distance data included in the received printing data.

<Advantages of the Second Embodiment>

Figure 7:
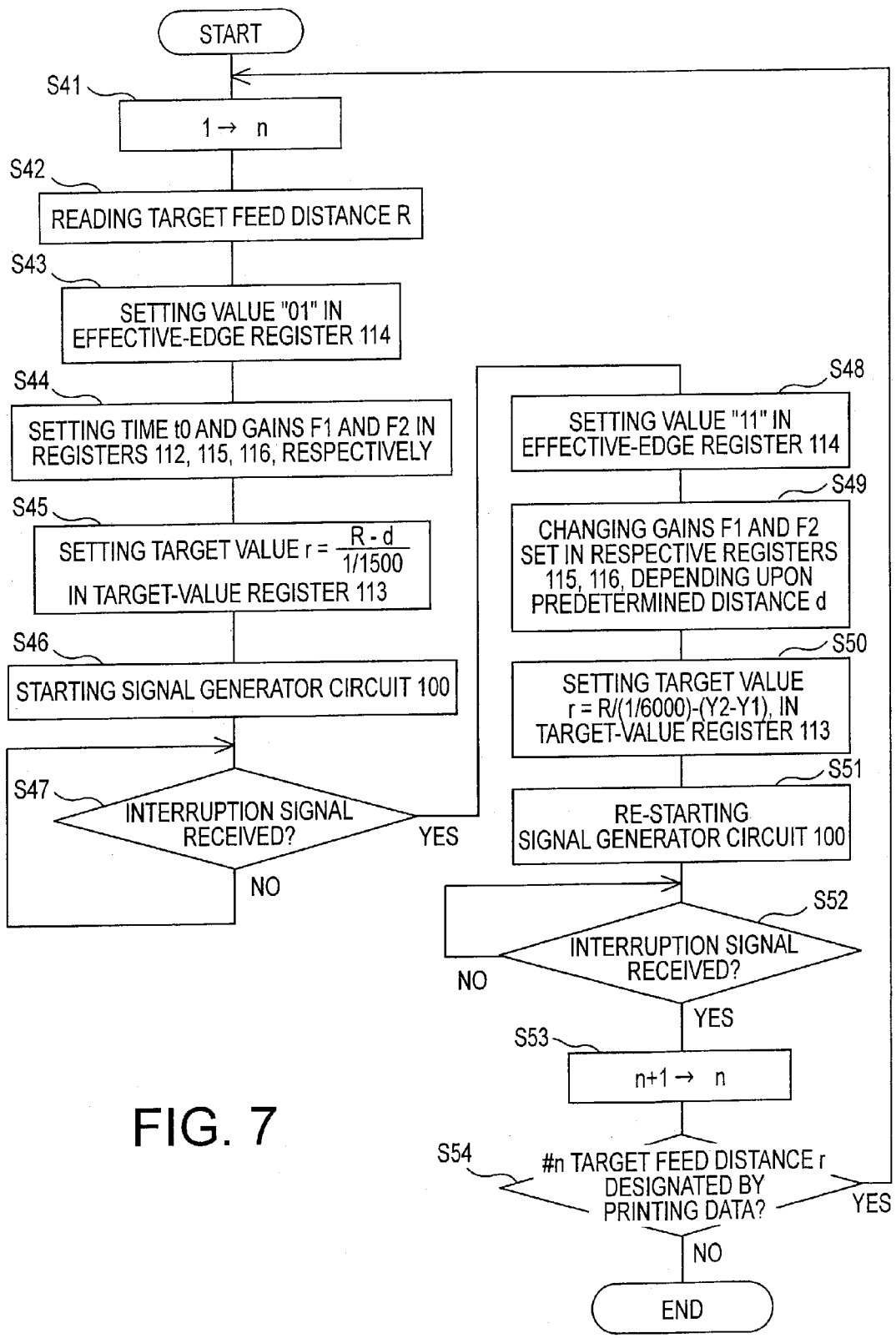
FIG. 7 is a flow chart illustrating a control routine executed by a motor control apparatus according to a second embodiment of this invention, for controlling the electric motor.

In the motor control apparatus of the second embodiment arranged as described above, the value "01" is set in the effective-edge register 114 in step S43 of FIG. 7, and the value "11" is set in the register 114 in step S48 when the detected actual feed distance of the paper sheet has reached the target feed distance R minus the predetermined distance d. Thus, the count y of the counter 122 per unit feed distance of the paper sheet is increased after the value "11" is set in the register 114 than when the value "10" was set in the register 114, so that the actual feed distance of the paper sheet is detected with a higher degree of resolution the paper sheet has been fed to the resolution-changing position resolution, which is spaced by the predetermined distance d from the stop position corresponding to the target feed distance R. In other words, the paper sheet can be comparatively rapidly fed to the resolution-changing position, with the comparatively low degree of resolution of detection of the actual feed distance, and can be accurately stopped at the stop position represented by the target feed distance R, with the comparatively high degree of resolution of detection of the actual feed distance. Accordingly, the present motor control apparatus permits the paper sheet to be fed to the stop position by a total distance equal to the target feed distance R, with a higher degree of positioning accuracy and at a higher speed, than a motor control apparatus not arranged to change the resolution of detection of the actual feed distance depending upon the target feed distance.

<Elements of Motor Control Apparatus of the Invention>

It will be understood from the foregoing description of the first and second embodiments that the encoder 12 provided on the printer 1 serves as a pulse generator operable to periodically generate signal pulses in the form of the encoder signals ENC1 and ENC2, which serve as a first pulse signal and a second pulse signal, respectively.

It will also be understood that the CPU 30 cooperates with the target-value register 113 of the register array 110 to constitute a target-motion-amount setter operable to set a target amount of motion in the form of the target feed distance R of the paper sheet represented by the target value r.

It will further be understood that the computing portion 131 of the signal generator 130 constitutes a feedback motor controller operable to control an electric motor in the form of the LF motor 20, on the basis of the target amount of motion and an actual amount of motion detected on the basis of the pulse signal generated by the pulse generator.

It will also be understood that the detecting portion 121 serves as a portion of a first edge counter operable to count only rising edges of the encoder signal ENC1 when the value "01" is set in the effective-edge register 114, also as a portion of a second edge counter operable to count rising and falling edges of the encoder signal ENC1 when the value "10" is set in the effective-edge register 114, and that the detecting portion 121 also serves as portions of a third edge counter and a fourth edge counter which are operable to count rising edges and falling edges of the encoder signal ENC2, respectively, when the value "11" is set in the effective-edge register 114. In the motor control apparatus of the invention, a edge-counting mode in which the edges of pulses of the pulse signal is counted is changed depending upon the value set in the effective-edge register 114. The values "01", "10" and "11" select a first, a second and a third edge-counting mode, respectively.

It will further be understood that steps S14 and S15 in the flow chart of FIG. 4 provide a resolution selector operable to select the resolution of detection of the actual amount of motion of a movable object in the form of the main roller 10, by setting the value corresponding to the target amount of motion in the form of the target feed distance R, in the effective-edge register 114.

It will further be understood that steps S43 and S48 in the flow chart of FIG. 7 also provide the resolution selector, and that step S17 in the flow chart of FIG. 4 and steps S45 and S50 provide a target-count calculator operable to calculate a count of the edges of the pulses of the pulse signal corresponding to the target amount of motion, on the basis of the selected resolution of detection of the actual amount of motion.

It will further be understood that the above-indicated target-motion-amount setter, resolution selector and target-counter calculator cooperate to constitute a major portion of a control-condition changing device operable to change the resolution of detection of the actual amount of motion of a movable object in the form of the main roller 10 or the paper sheet driven or fed by an electric motor in the form of the LF motor 20.

<Modifications of First and Second Embodiments>

While the first and second embodiments of this invention have been described, it is to be understood that the invention is not limited to the details of those illustrated embodiments, but may be embodied with various changes or modifications.

The first and second embodiments of the motor control apparatus of the invention are adapted to be used to control the LF motor 20 of the paper feeding mechanism provided in the printer 1. However, the motor control apparatus according to the present invention is equally applicable to an electric motor provided to move a movable object in the form of a carriage which carries a printing head of the printer 1. In this case, the motor control apparatus includes a detector such as a linear encoder operable to detect the actual motion of the carriage.

Although the rotary encoder 12 is used to detect the actual amount of motion of the paper feeding mechanism in the illustrated embodiments, a detector other than the rotary encoder may be used to detect the actual amount of motion of a movable portion (e.g., a rotor) of an electric motor or a movable object driven by the electric motor.

In the first and second embodiments, the encoder 12 is arranged to generate two kinds of encoder signals ENC1 and ENC2. However, the motor control apparatus of the present invention may use an encoder arranged to generate three or more kinds of encoder signals.

<Third Embodiment>

Figure 9:
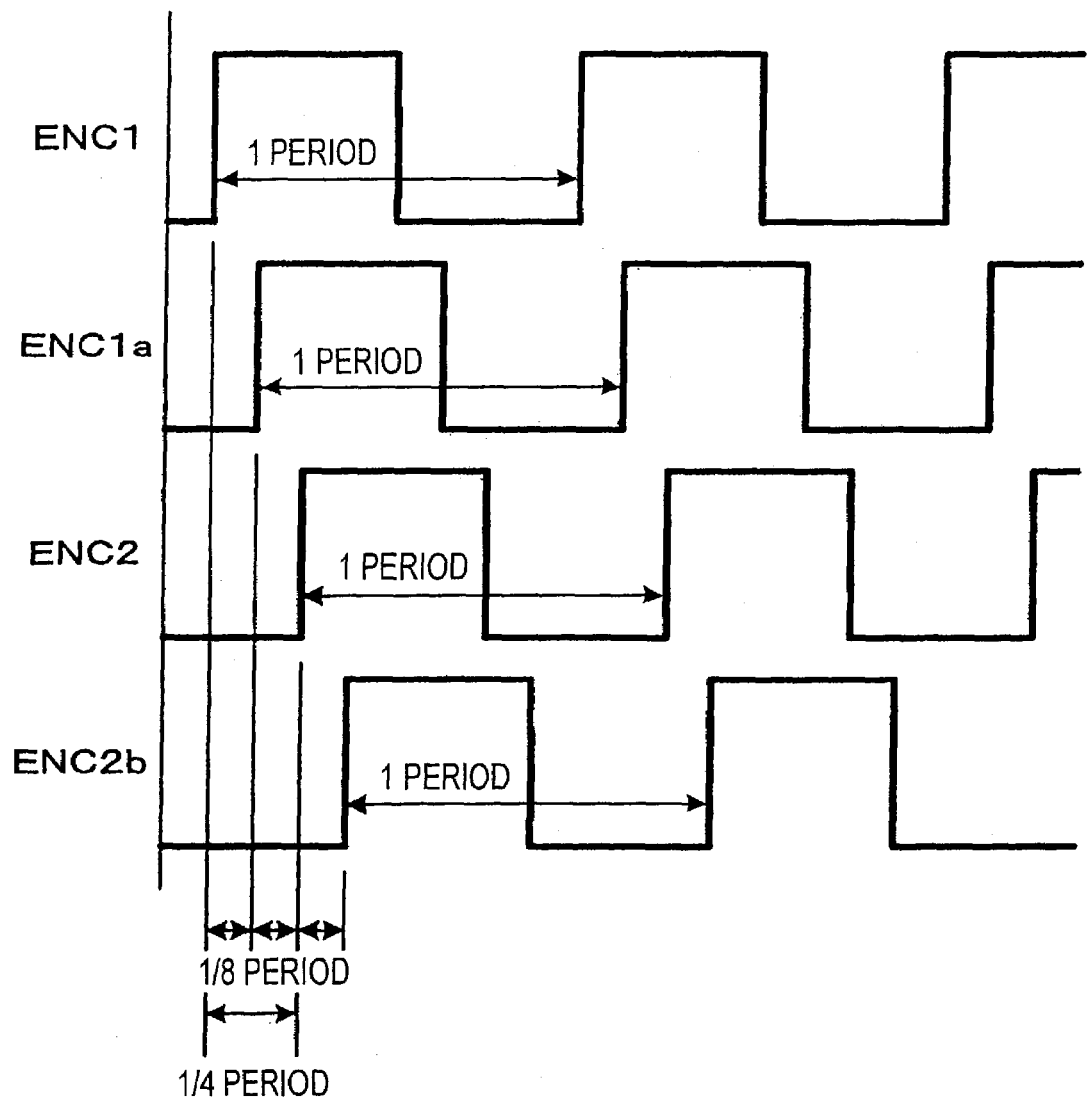
FIG. 9 is a view showing encoder signals of an encoder used in a third embodiment of the invention.

For example, a motor control apparatus according to a third embodiment of this invention uses an encoder arranged to generate four kinds of encoder signals, as shown in FIG. 9, namely, the two encoder signals ENC1 and ENC2 having a phase difference equal to a ¼ of their period, an encoder signal ENC1$a$ each pulse of which has a rising edge which is retarded with respect to that of the encoder signal ENC1 by ⅛ of the period, and an encoder signal ENC2$a$ each pulse of which has a rising edge which is retarded with respect to that of the encoder signal ENC2 by ⅛ of the period. In this case, the detecting portion of 121 of the paper feed monitor 120 is arranged to detect the edges of the pulses of the encoder signals, according to the value set in the effective-edge register 114, in the following manner. When a value "001" is set in the register 114, the detecting portion 121 detects only the rising edges of the encoder signal ENC1. When a value "010" is set in the register 114, the detecting portion 121 detects both of the rising and falling edges of the encoder signal ENC1. When a value "011" is set in the register 114, the detecting portion 121 detects both of the rising and falling edges of both of the encoder signals ENC1 and ENC2. When a value "111" is set in the register 114, the detecting portion 121 detects both of the rising and falling edges of all of the four encoder signals ENC1, ENC2, ENC1$a$ and ENC2$a$. In this case, step S14 of the flow chart of FIG. 4 is modified to set the value "001" in the register 114 when the target feed distance R is larger than 1 inch, set the value "010" in the register 114 when the target feed distance R is larger than 1/16 inch and equal to or smaller than 1 inch, set the value "011" in the register 114 when the target feed distance R is larger than 1/32 inch and equal to or smaller than 1/16 inch, and set the value "111" in the register 114 when the target feed distance R is smaller than 1/32 inch. Further, step S17 is modified to set in the target-value register 113: a target value r=R/(1/1500) when the value "001" is set in the register 114; a target value r=R/(1/3000) when the value "010" is set in the register 114; a target value r=R/(1/6000) when the value "011" is set in the register 114; and a target value r=R/(1/12000) when the value "111" is set in the register 114. When the value "111" is set in the effective-edge register 114, the actual feed distance of the paper sheet can be detected with a higher degree of resolution than when the value "11" is set in the register 114 in the first embodiment.

In the first, second and third embodiments described above, the edges of the pulses of the encoder signals that are used by the detecting portion 121 to detect the actual amount of motion of the paper sheet are selected on the basis of the value presently set in the effective-edge register 114. However, the paper feed monitor 120 may be modified such that the detecting portion 121 always detects the rising and falling edges of the encoder signals ENC1, ENC2, or the encoder signals ENC1, ENC1$a$, ENC2 and ENC2$a$, and the counter 122 selects the edges of the pulses to be counted, on the basis of the value set in the effective-edge register 114.

The printer 1 to which the above-described embodiments are applicable may be an ink-jet printer having a printing head which is moved with a carriage and which is arranged to deliver droplets of an ink from nozzles at each stop position of the paper sheet established by each feeding motion of the paper sheet according to the corresponding target feed distance R. That is, each target feed distance R represents a desired ink-delivery interval between adjacent positions of the paper sheet in its feeding direction at which the droplets of ink are delivered from the printing head. When the ink-delivery interval is relatively short, an image must usually be printed with a relatively high degree of resolution. In this case, a variation in the ink-delivery interval will cause a considerable reduction in the quality of the printed image. When the ink-delivery interval is relatively large, on the other hand, the required degree of resolution of the image is not so high, and a slight variation in the ink-delivery interval will not cause a considerable reduction in the quality of the printed image. Accordingly, the printing operation at a relatively large ink-delivery interval does not require a high degree of accuracy of control of the actual feed distance of the paper sheet with respect to the target value.

Where the ink-delivery interval is larger than the length of at least one row of the nozzles of the printing head which extends in the feeding direction of the paper sheet, there is left a blank space within the ink-delivery interval, namely, a plurality of images are printed with a blank space left between the adjacent images in the secondary scanning direction, for example. In this case where the ink-delivery interval is relatively large or the target feed distance is relatively large, it is not necessary to control the actual feed distances of the movable object (paper sheet) so accurately, but it is desired to move the movable object at a relatively high speed to each stop position corresponding to the target feed distance. In view of this, steps S14 and S15 of FIG. 4 may be modified to set the value "01" in the effective-edge register 114 when the target feed distance R is larger than predetermined threshold values, so that the actual feed distance is detected with a comparatively low degree of resolution. This arrangement to select the lowest degree of resolution of detection of the actual feed distance permits a comparatively rapid movement of the paper sheet to each predetermined stop position corresponding to the target feed distance R, and a decrease in the load of the counter when the edges of the pulses of the encoder signals are counted.

The threshold value above which the lowest degree of resolution of detection of the actual feed distance of the paper sheet is selected may be equal to the length of the row or rows of the nozzles of the printing head mounted on the carriage. In this case, step S14 or S15 is formulated to set the value "01" in the effective-edge register 114 to select the lowest resolution of detection, when the target feed distance R is larger than the length of the row or rows of the nozzles. This arrangement to select the lowest resolution of detection when the target feed distance R is larger than the length of the row or rows of the nozzles permits a decrease in the load of the counter when the pulse edges of the encoder signals are counted.

The first embodiment is arranged to determine in step S13 of FIG. 4 whether the resolution selector switch 34 is placed in the position for selecting the FINE printing mode or in the position for selecting DRAFT printing mode. However, the resolution selector switch 34 may be replaced by a printing-resolution register provided in the register array 110 of the signal generator circuit 100 or in the memory 32, so that the determination in step S13 as to whether the FINE printing mode is presently selected or not is made on the basis of a value set in the printing-resolution register.

<Fourth Embodiment>

Figure 10:
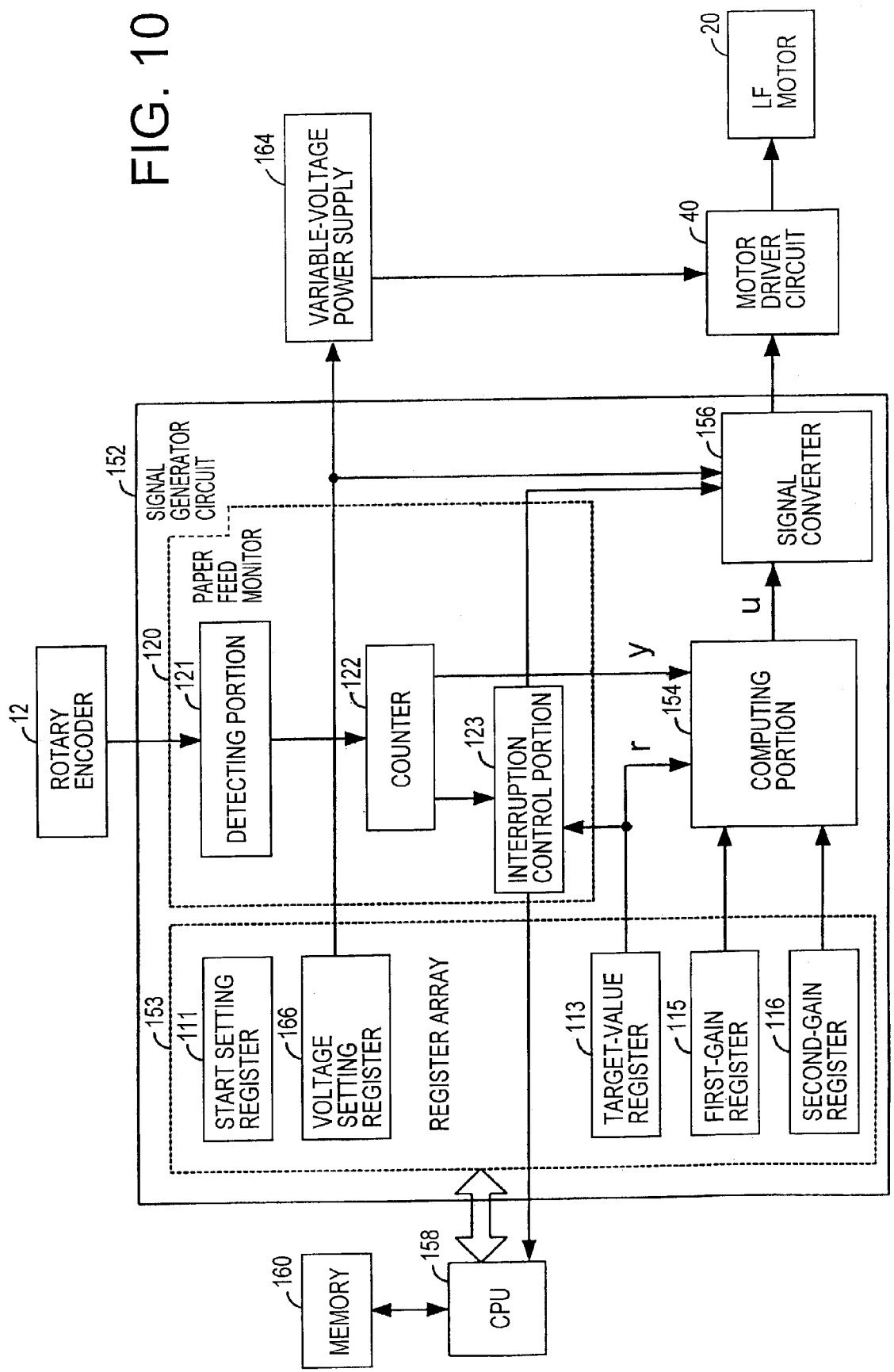
FIG. 10 is a block diagram corresponding to that of FIG. 3, showing a motor control apparatus constructed according to a fourth embodiment of this invention.

Referring next to FIGS. 10–13, there will be described a motor control apparatus constructed according to a fourth embodiment of this invention. This motor control apparatus includes a signal generator circuit 152, which includes a register array 153, and a feedback processor in the form of a computing portion 154 connected to a signal converter 156 arranged to apply PWM signals to the motor driver circuit 40, as shown in FIG. 10. The signal generator circuit 152 is connected to a CPU 158, which in turn is connected to a memory 160. Like the signal generator circuit 100 provided in the first embodiment of FIG. 3, the signal generator circuit 152 is a so-called ASIC (Application Specific Integrated Circuit), wherein the register array 153 includes the start setting register 111, the target-value register 113, and the first-gain and second-gain registers 115, 116. However, the register array 153 does not include the effective-edge register 114, but further includes a voltage setting register 166 which will be described. The signal generator circuit 152 also incorporates the paper feed monitor 120 including the detecting portion 121, the counter 122 and the interruption control portion 123. The memory 160 includes a RAM, and a ROM which stores various kinds of data including a data table 162 which is shown in FIG. 12 and will be described below.

The motor control apparatus according to the fourth embodiment includes a variable-voltage power supply 164 which is connected to the signal generator circuit 152 and which is operable to change a voltage to be applied to the motor driver circuit 40, according to a signal received from the signal generator circuit 152. The LF motor 20 is operated with electric power supplied from the variable-voltage power supply 164 through the motor driver circuit 40.

Figure 11:
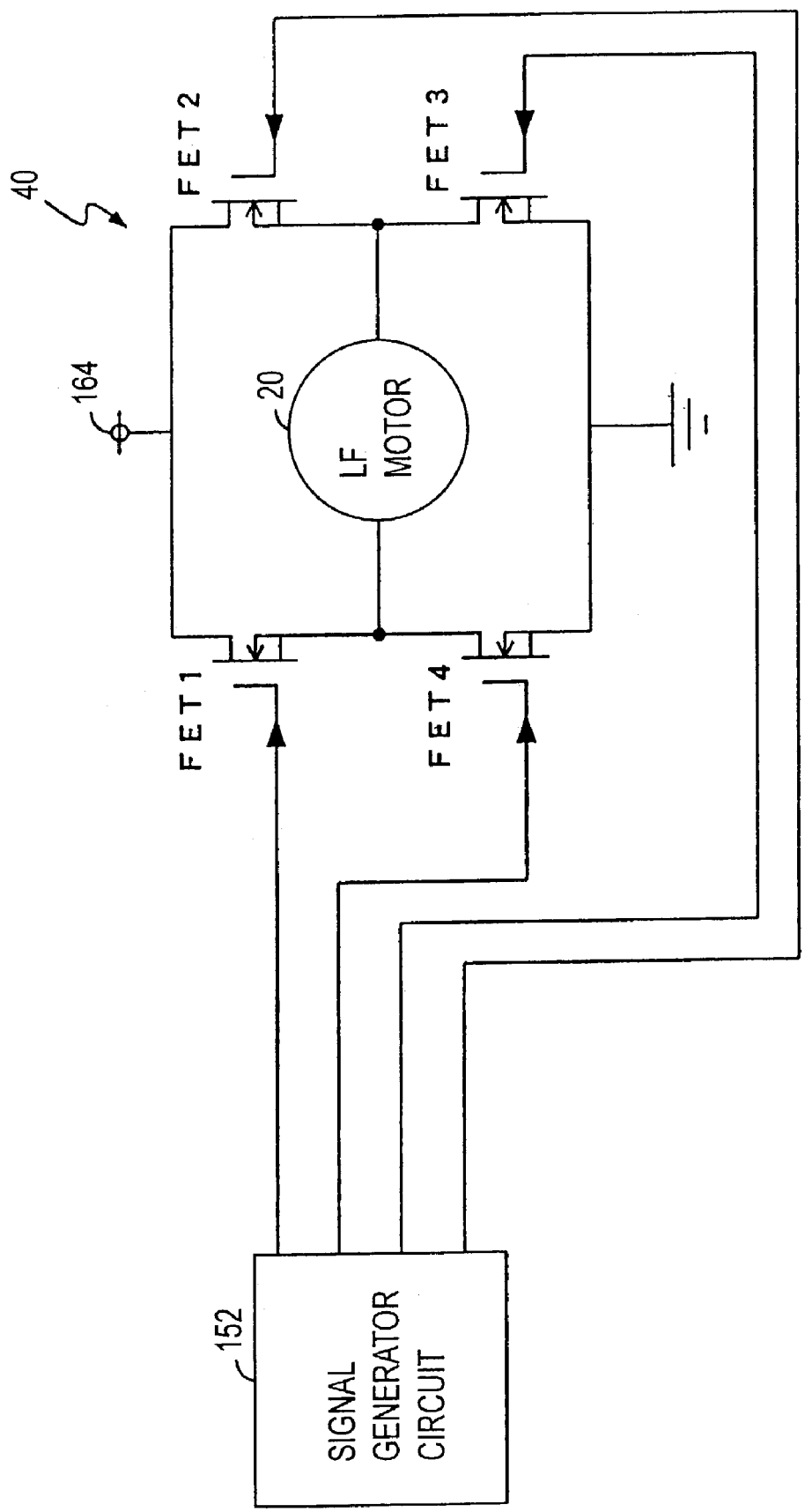
FIG. 11 is a block diagram illustrating an arrangement of a motor driver circuit, a variable-voltage power supply, a signal generator circuit and an electric motor, in the motor control apparatus of FIG. 10.

As shown in FIG. 11, the motor driver circuit 40 includes four N-channel enhancement type MOSFETs (hereinafter abbreviated as "FETs", such that a series connection of FET1 and FET4 and a series connection of FET2 and FET3 are connected in parallel with each other between a positive terminal of the variable-voltage power supply 164 and the ground. The LF motor 20 is connected to a line connecting the FET1 and FET4 and a line connecting the FET2 and FET3, such that a so-called "H-bridge circuit" is formed by the four FETs and the LF motor 20.

The FET1, FET2, FET3 and FET4 of the motor driver circuit 40 have respective gates arranged to receive respective PWM signals generated by the signal generator circuit 152. The four FETs are turned ON and Off according to the PWM signals, so as to control the amount and direction of flow of an electric current to be applied to the LF motor 20. The LF motor 20 is operated in the forward direction when the electric current flows through the LF motor 20 in a direction from the FET1 toward the FET3, and in the reverse direction when the electric current flows in a direction from the FET 2 toward the FET 4. The four FETs are connected in parallel to respective diodes such that a cathode of each diode is oriented in the upstream direction of the H-bridge circuit, while an anode of each diode is oriented in the downstream direction of the H-bridge circuit, so that a counter electromotive force generated when the FET is turned ON and OFF is applied to the variable-voltage power supply 164, for thereby protecting each FET against the counter electromotive force.

The signal converter 156 is a PWM-signal generator operable to generate the above-indicated four PWM signals whose duty ratio is determined on the basis of the control signal generated by the computing portion 154, and a voltage value of the variable-voltage power supply 164, which voltage value is set in the voltage setting register 166. The PWM signal generated by the signal converter 156 are applied to the motor driver circuit 40.

The interruption control portion 123 applies a stop command to the signal converter 156 when the count y of the counter 122 coincides with the target value r set in the target-value register 113. Upon reception of this stop command, the signal converter 156 generates the PWM signals so as to apply a dynamic brake to the LF motor 20.

Figure 3:
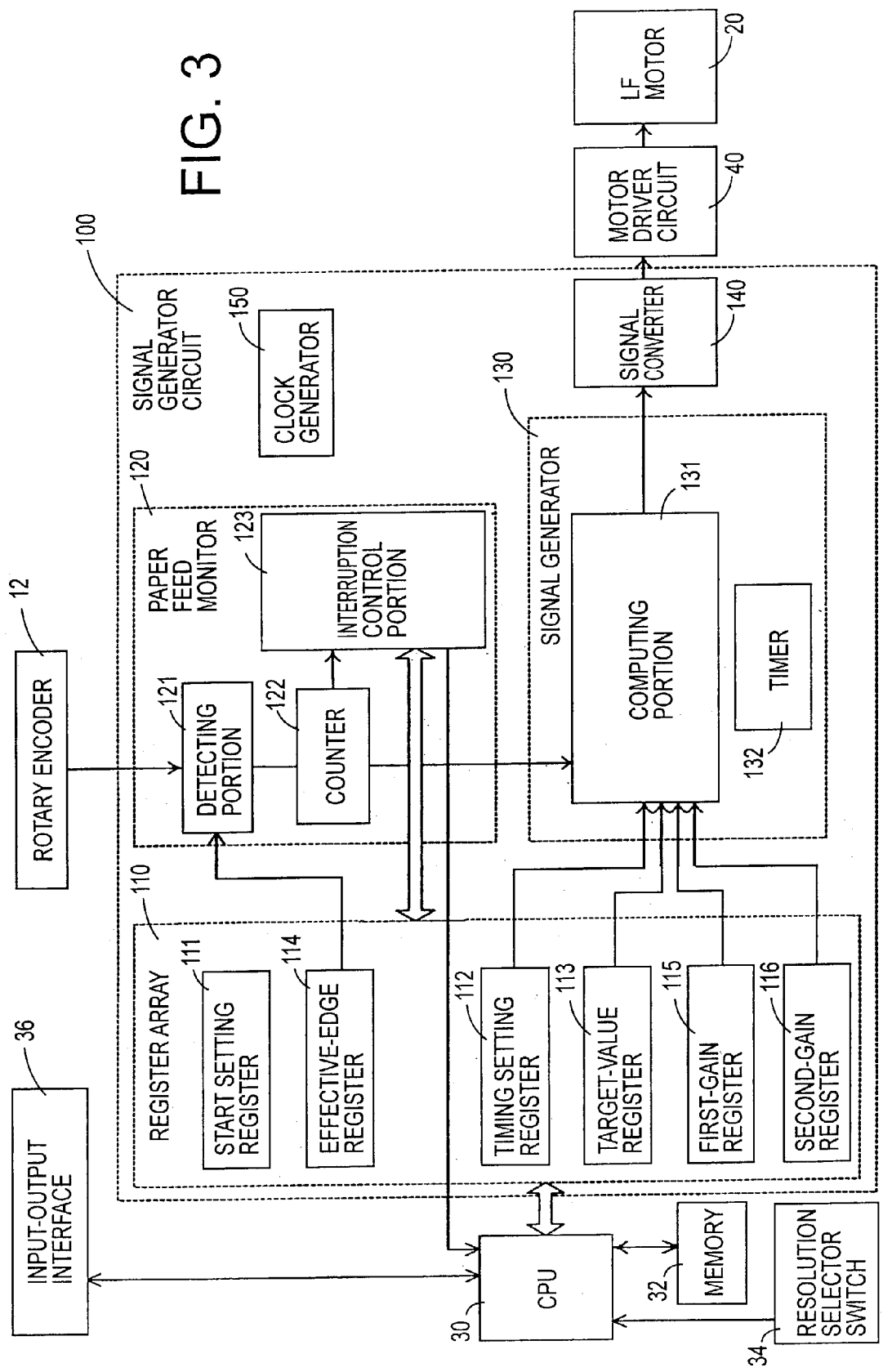
FIG. 3 is a block diagram showing the motor control apparatus according to a first embodiment of this invention.

Like the computing portion 131 of the signal generator 130 provided in the first embodiment of FIG. 3, the computing portion 154 serving as the feedback processor generates the motor control signal u on the basis of a difference between the count y of the counter 122 and the target value r set in the target-value register 113, the integral gain F1 set in the first-gain register 115 and the state-feedback gain F2 set in the second-gain register 116, as described above by reference to FIG. 6. The signal converter 156 receives the motor control signal u, and determines the duty ratio of the four PWM signals on the basis of the motor control signal u and the voltage value of the variable-voltage power supply 164 which is set in the voltage setting register 166. The FETs of the motor driver circuit 40 are turned ON and OFF according to the duty ratio of the PWM signals, so that the operating speed of the LF motor 20 is controlled.

The data table 162 stored in the ROM of the memory 160 represents a relationship between the target feed distance R (inch) and the voltage value (V) of the variable-voltage power supply 164, as indicated in FIG. 12.

Figure 13:
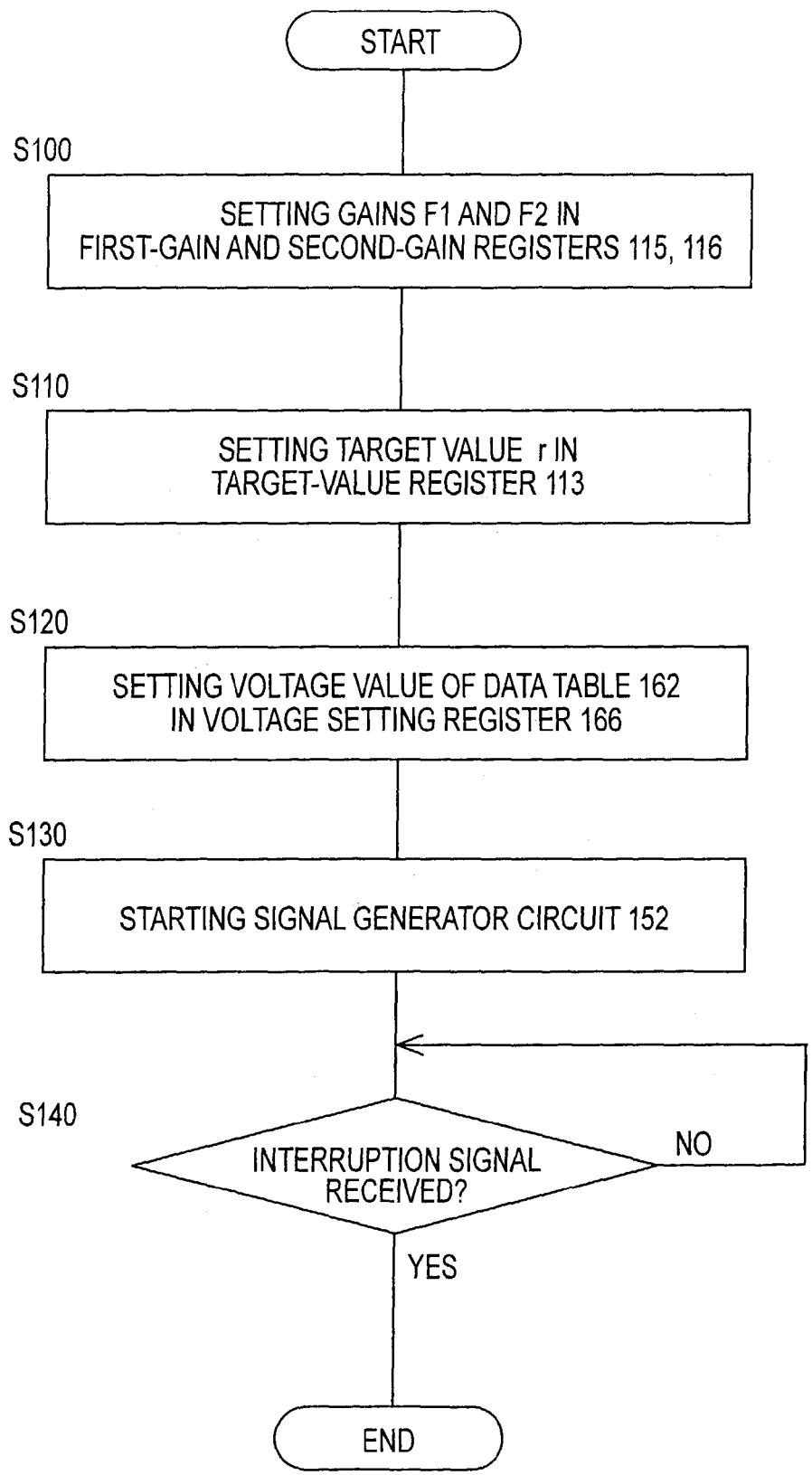
FIG. 13 is a flow chart illustrating a control routine executed by the motor control apparatus of FIG. 10.

The present motor control apparatus including the CPU 158 is arranged to execute a control routine illustrated in the flow chart of FIG. 13, for controlling the LF motor 20 of the paper feeding mechanism of the printer 1 shown in FIG. 1.

The control routine is initiated with step S100 to set the present angular position of the main roller 10 as a zero position, and set the integral gain F1 and the state-feedback gain F2 in the first-gain and second-gain registers 115, 116 of the register array 153. Then, the control flow goes to step S110 to set a target value r corresponding to the target feed distance R of the paper sheet, in the target-value register 113. Step S110 is followed by step S120 in which the voltage value (V) which corresponds to the target feed distance R represented by the target value r is read out from the data table 162, and this voltage value is set in the voltage setting register 166. The control flow then goes to step S130 to start the signal generator circuit 152, by setting appropriate parameters in the start setting register 111 of the register array 153. Step S130 is followed by step S140 to determine whether the interruption signal has been generated by the interruption control portion 123, that is, whether the actual feed distance of the paper sheet as detected by the paper feed monitor 120 has reached the target feed distance R represented by the target value r set in the target-value register 113, as a result of operation of the LF motor 20 to rotate the main roller 10 under the control of the signal generator circuit 152 according to the various parameters set in the register array 153. If the interruption signal has been generated by the interruption control portion 123, an affirmative decision (YES) is obtained in step S140, and the present control routine is terminated.

In the motor control apparatus according to the third embodiment described above, the voltage to be applied to the LF motor 20 is changed on the basis of the target feed distance R of the paper sheet such that the voltage decreases with a decrease in the target feed distance R, as indicated in FIG. 12 for illustrative purpose only. Accordingly, the duty ratio of the PWM signals can be changed in a comparatively large range, by suitably determining the voltage value of the variable-voltage power supply 164, even when the target feed distance R is relatively small. Thus, the rotating speed of the drive shaft of the LF motor 20 or the main roller 10 rotated by the LF motor 20 can be intricately controlled with high accuracy.

Thus, the present motor control apparatus permits an improvement over the known motor control apparatus, in the accuracy of control an actual amount of a rotary motion of a movable portion in the form of the drive shaft of the LF motor 20, a rotary motion of a movable object in the form of the main roller 10 driven by the electric motor 20, or a linear motion of the paper sheet fed by the main roller 10, so as to coincide with the target amount, even when the target amount is considerably small.

It will be understood from the foregoing description of the present fourth embodiment that the CPU 158 cooperates with the target-value register 113 to constitute a target-motion-amount setter operable to set a target amount of motion of a movable portion of an electric motor in the form of the drive shaft of the LF motor 20, a target amount of motion of a movable object in the form of the main roller 10 driven by the LF motor 20, or a target amount of motion of a movable object in the form of the paper sheet moved by the LF motor 20 through the main roller 10. It will also be understood that the CPU 158 implementing step S120 cooperates with the memory 160 storing the data table 162 and the voltage setting register 166 to constitute a voltage setter operable to set a voltage to be applied to the electric motor 20 such that the voltage is changed depending upon the target amount of motion. It will further be understood that the encoder 12 and the paper feed monitor 120 cooperate to constitute an actual-motion-amount detector operable to detect an actual amount of motion of the movable portion of the electric motor or the movable object, while the computing portion 154 and the signal converter 156 constitute a feedback motor controller operable to effect a PWM control of the electric motor such that the actual amount of motion coincide with the target amount of motion. It will also be understood that the memory 160 serves as a data table memory storing the data table 162 representative of a relationship between the target amount of motion and the voltage to be applied to the electric motor. The data table memory constitutes a part of the voltage setter.

It will also be understood that the above-indicated target-motion-amount setter, voltage setter and data table memory cooperate to constitute a major portion of a control-condition changing device operable to change the voltage to be applied to the electric motor, depending upon the target amount of motion of the main roller 10 or the paper sheet rotated or fed by an electric motor in the form of the LF motor 20.

<Fifth Embodiment>

Figure 14:
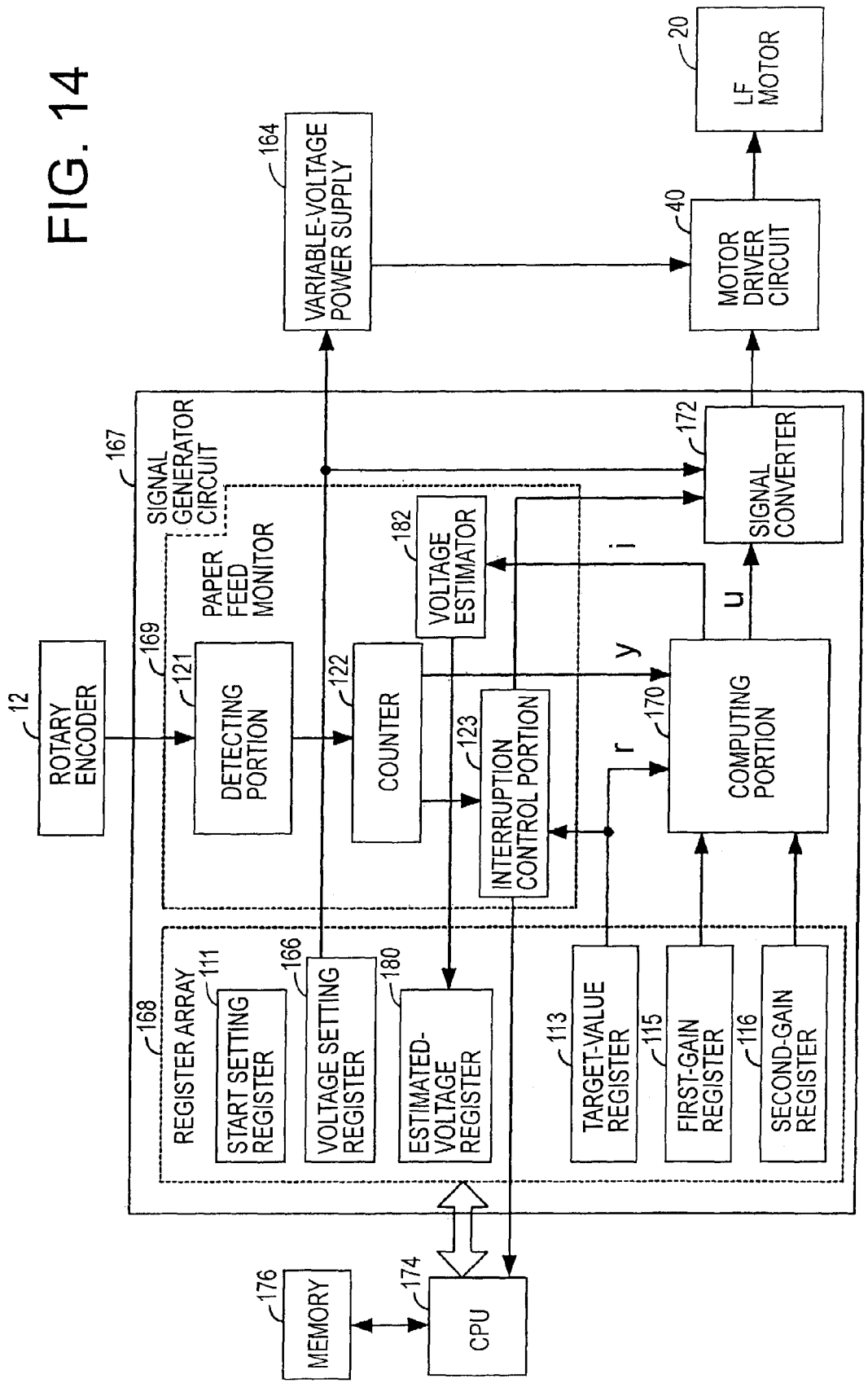
FIG. 14 is a block diagram showing a motor control apparatus according to a fifth embodiment of the present invention.
Figure 15:
FIG. 15 is a view for explaining a data table stored in a memory used in the embodiment of FIG. 14.
Figure 16:
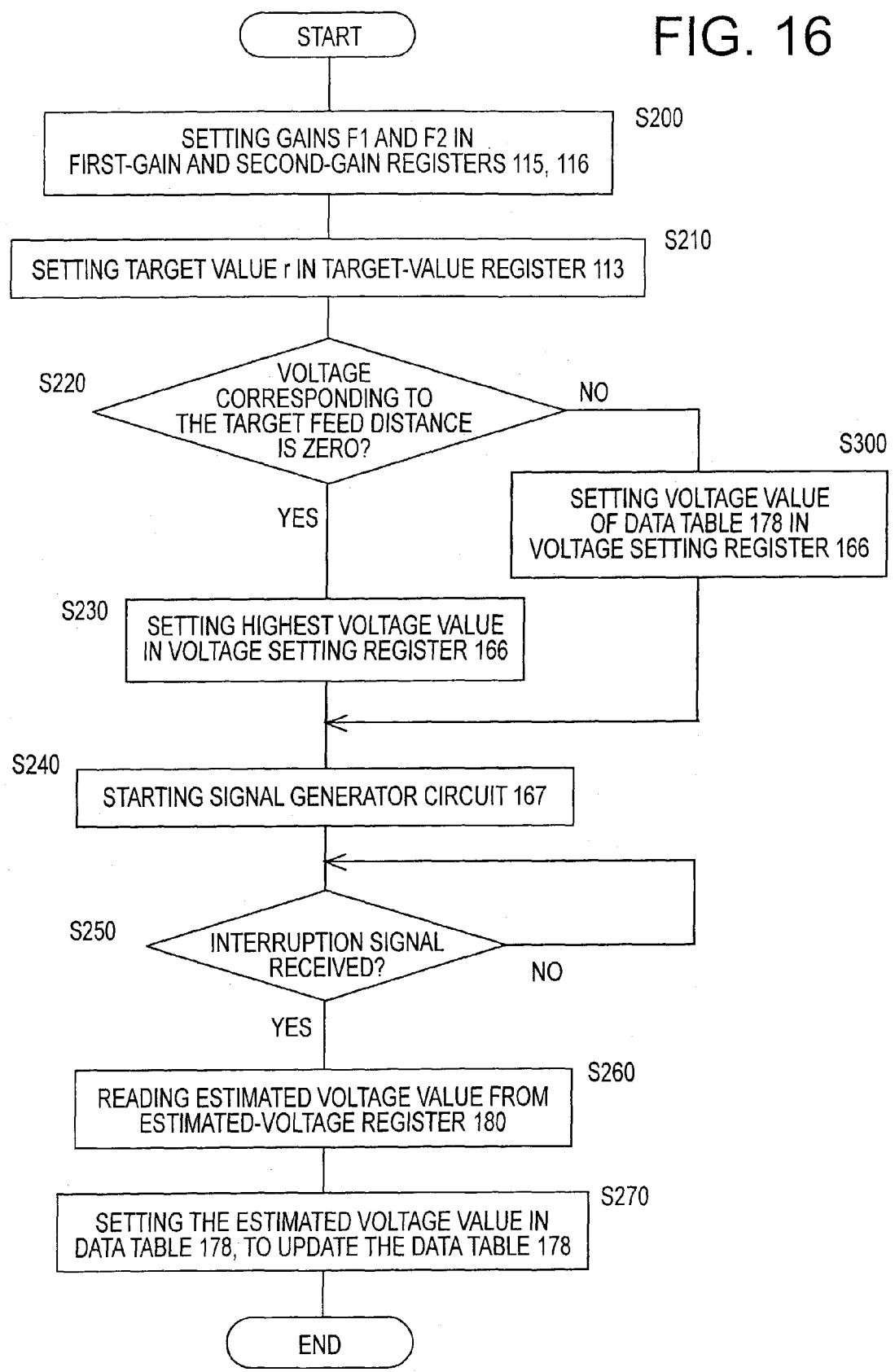
FIG. 16 is a flow chart illustrating a control routine executed by the motor control apparatus of FIG. 14.

Referring further to FIGS. 15 and 16, there will be described a motor control apparatus according to a fifth embodiment of the invention. This motor control apparatus includes a signal generator circuit 167 including a register array 168, a paper feed monitor 169, and a feedback processor in the form of a computing portion 170 connected to a signal converter 172 arranged to apply PWM signals to the motor driver circuit 40, as shown in FIG. 14. The signal generator circuit 167 is connected to a CPU 174, which in turn is connected to a memory 176. Like the signal generator circuit 152 provided in the embodiment of FIG. 10 described above, the signal generator circuit 167 is also a so-called ASIC (Application Specific Integrated Circuit), wherein the register array 168 includes an estimated-voltage register 180 described below, as well as the start setting register 111, the target-value register 113, the first-gain and second-gain registers 115, 116, and the voltage setting register 166. The memory 176 includes a RAM, and a ROM which stores a data table 178 which is shown in FIG. 15 and will be described below. The paper feed monitor 169 further includes a voltage estimator 182 which will be described. In the other aspects, the motor control apparatus according to the fifth embodiment is identical in construction with the motor control apparatus according to the fourth embodiment.

Figure 6:
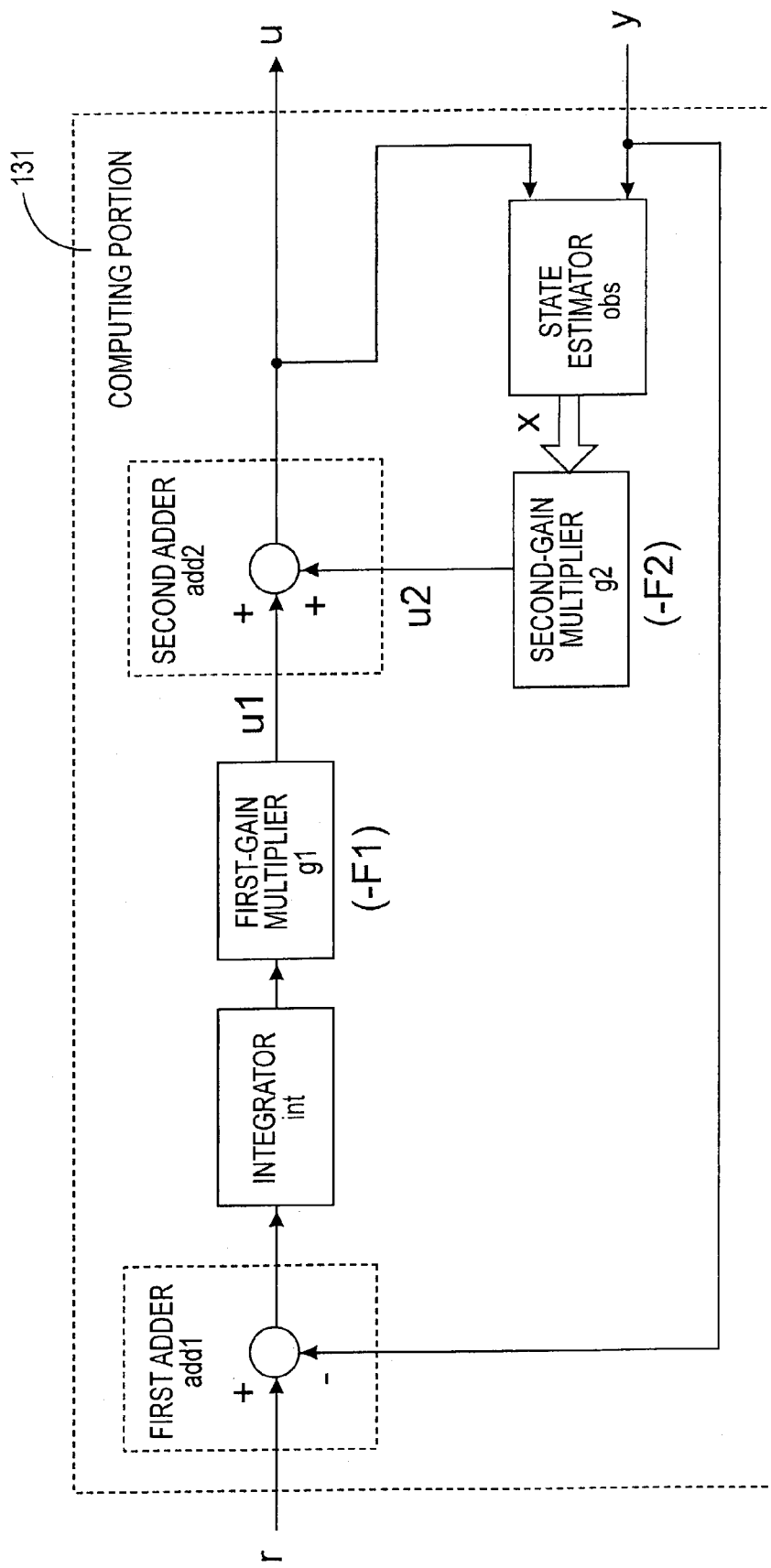
FIG. 6 is a block diagram showing an arrangement of a computing portion of a signal generator of the signal generator circuit.

In the motor control apparatus according to the present fifth embodiment, the computing portion 170 is arranged to hold a maximum value of electric current (maximum current value "i") flowing through the LF motor 20, on the basis of the state quantity x of the state estimator obs (FIG. 6).

The voltage estimator 182 of the paper feed monitor 169 is arranged to multiply the maximum current value "i" calculated by the computing portion 170, by an impedance value of the LF motor 20, for thereby calculating a voltage value of the variable-voltage power supply 15, which is required for the actual current value of the LF motor 164 to coincide with the maximum current value "i".

The voltage value calculated by the voltage estimator 182 is stored in the estimated-voltage register 180 of the register array 168. Described in detail, the computing portion 170 holds as the maximum current value "i" a maximum amount of electric current flowing through the LF motor 20 during the feedback control so as to feed the paper sheet by the target feed distance R. Upon completion of the feedback control of the LF motor 20 by the signal generator circuit 167 so as to feed the paper sheet by the target feed distance R, the voltage estimator 182 is operated to estimate the voltage value required for the actual current value of the LF motor 20 to coincide with the maximum current value "i" held by the computing portion 170. The thus estimated voltage value is stored in the estimated-voltage register 180 of the register array 168.

There will be described a control routine executed by the present motor control apparatus including the CPU 174, for controlling the LF motor 20 to rotate the main roller 10 for feeding the paper sheet. This control routine is illustrated in the flow chart of FIG. 16. Before the control routine is initiated, the data table 178 which is stored in the memory 176 and which represents a relationship between the target feed distance R (inch) and the voltage value (V) of the variable-voltage power supply 164 has been initialized such that the voltage value is zeroed for all ranges of the target feed distance R, as indicated in FIG. 15.

The control routine of FIG. 16 is initiated with step S200 to set the present angular position of the main roller 10 as a zero position, and set the integral gain F1 and the state-feedback gain F2 in the first-gain and second-gain registers 115, 116 of the register array 168. Then, the control flow goes to step S210 to set a target value r corresponding to the target feed distance R of the paper sheet, in the target-value register 113. Step S210 is followed by step S220 to determine whether the voltage value which is set in the data table 178 and which corresponds to the target feed distance R is 0V. If an affirmative decision (YES) is obtained in step S220, this means that a feeding motion of the paper sheet so as to feed the paper sheet by the target feed distance R represented by the target value r set in the target-value register 113 has never been effected and is to be effected for the first time. In this case, the control flow goes to step S230 in which the highest voltage available from the variable-voltage power supply 164 is set in the voltage setting register 166.

Step S230 is followed by step S240 to set appropriate parameters in the start setting register 111 of the register array 168, for starting the signal generator circuit 167 to initiate a rotary motion of the main roller 10 for initiating a feeding motion of the paper sheet. Step S240 is followed by step S250 to determine whether the interruption signal has been generated by the interruption control portion 123 of the paper feed monitor 169. If an affirmative decision (YES) is obtained in step S250, the control flow goes to step S260 to read the estimated voltage value set in the estimated-voltage register 180, and to step S270 in which this estimated voltage value is set in the data table 178 of the memory 176, such that the estimated voltage value corresponds to the target feed distance R set in step S210, whereby the data table 178 is updated. Thus, the control routine of FIG. 16 is terminated.

If the voltage value set in the data table 178 and corresponding to the target feed distance R is not 0V, that is, if a negative decision (NO) is obtained in step S220, this means that the feeding motion of the paper sheet so as to feed the paper sheet by the present target feed distance R represented by the target value r set in the target-value register 113 has ever been effected. In this case, the control flow goes to step S300 in which the voltage value set in the data table 178 is set in the voltage setting register 166. Then, steps S240–S270 are implemented, and the control routine is terminated.

In the motor control apparatus according to the fifth embodiment of this invention arranged as described above, the voltage value of the LF motor 20 is estimated for each of different target feed distance values R, on the basis of the maximum current value "i" held by the computing portion 170 for each target feed distance value R, and is set in the data table 178 for each of the specific target feed distance values R. Accordingly, the present motor control apparatus has the same advantages as the apparatus of the fourth embodiment. Further, the present motor control apparatus permits selection of the optimum voltage value irrespective of a chronological change in the load of the paper feeding mechanism, and assures improved accuracy of control of the actual feed distance of the paper sheet with respect to the target value R.

In the fifth embodiment, the voltage of the LF motor 20 required for coincidence of its actual electric current value with the maximum value "i" for each specific target feed distance R of the paper sheet is variably set in the voltage setting register 166, for changing the voltage of the variable-voltage power supply 164, so that the duty ratio of the PVVM signals to be applied to the motor driver circuit 40 is variable in a range between 0% and 100%, for any target feed distance R, whereby the operating speed of the LF motor 20 or the main roller 10 can be intricately controlled with high accuracy.

The state estimator obs of the computing portion 170 serving as the feedback processor is arranged to determine, as the maximum current value "i" flowing through the LF motor 20, a highest value of the electric current estimated according to a state estimating equation which includes variable parameters representative of dynamic behaviors of the LF motor 20. Accordingly, the state estimator obs permits accurate estimation of the maximum value "i" of electric current flowing through the LF motor 20 during its operation so as to feed each target feed distance R, so that the voltage estimator 182 can accurately estimate the voltage of the LF motor 20 required for coincidence of its actual electric current with the maximum current value "i" estimated by the state estimator obs, for each target feed distance R, whereby the paper sheet can be fed by the target feed distance R with high accuracy.

It will be understood from the foregoing description of the fifth embodiment that the state estimator obs of the computing portion 170 serves as a peak-current estimator operable on the basis of the detected amount of motion of the paper sheet, to estimate a maximum value of electric current flowing through the electric motor 20 during its operation for coincidence of the actual amount of motion of the paper sheet with the target amount of motion. It will also be understood that the voltage estimator 182 serves as a voltage calculator operable on the basis of the estimated maximum value of electric current, to calculate the voltage value of the electric motor 20 required for coincidence of the actual electric current of the motor with the estimated maximum value of electric current. It will further be understood that a portion of the CPU 174 assigned to implement steps S260 and S270 constitutes a data-table updating device operable to update the data table 178, by replacing the voltage value of the data table 162 with the voltage value calculated by the voltage calculator.

It will also be understood that the above-indicated target-motion-amount setter in the form of the target-value register 113, the voltage setter in the form of the voltage setting register 166, the data table memory in the form of the data table 178, the peak-current estimator in the form of the state estimator obs, the voltage calculator in the form of the voltage estimator 182, and the data-table updating device corresponding to steps S260 and S270 cooperate to constitute a major portion of a control-condition changing device operable to change the voltage to be applied to the electric motor, depending upon the target amount of motion of the main roller 10 or the paper sheet rotated or fed by an electric motor in the form of the LF motor 20.

While the motor control apparatus according to the fifth embodiment is arranged to update the voltage values of the data table 178 for all of the different target feed distance values R in steps S260 and S270, the apparatus may be modified to update only the voltage values of the data table 178 which are initially set to be 0V.

In the motor control apparatus of the fifth embodiment, the data table 178 is updated by replacing the presently set voltage value of the data table 178 corresponding to the target feed distance R represented by the target value r set in the target-value register 113, with the estimated voltage value read out from the estimated-voltage register 166. However, the apparatus may be modified to store in the memory 176 all of the voltage values estimated by the voltage estimator 182, and update each voltage value of the data table 178 on the basis of the estimated voltage value read out from the estimated-voltage register 166 and the estimated voltage values stored in the memory 176 for the target feed distance R in question.

In the fifth embodiment, the voltage values of the data table 178 are initially set to be 0V for all ranges of the target feed distance R. However, the voltage values of the data table 178 may be initially set to be predetermined initial values corresponding to the respective ranges of the target feed distance R, and updated in steps S260 and S270.

In the fifth embodiment, the voltage estimator 182 is arranged to estimate the voltage value required for coincidence of the actual electric current of the LF motor 20 with the maximum current value "i" estimated by the state estimator obs of the computing portion 170. However, the voltage estimator 182 may be arranged to estimate the voltage value of the LF motor 20 required for coincidence of the actual electric current with a value which is larger than the maximum current value "i" by a relatively small amount.

While the motor driver 40 is arranged such that the H-bridge circuit is formed by the four FETs and the LF motor 20, the motor driver may be connected to a series connection of two variable-voltage power supplies such that the series connection of the two variable-voltage power supplies are connected in parallel to two series connections of two FETs, and the LF motor 20 is connected between the series connection of the two variable-voltage power supplies and the two series connections of the two FETs.

The first, second and third embodiments are adapted to change the resolution of detection of the actual feed distance of the paper sheet depending upon the target feed distance R, while the fourth and fifth embodiments are adapted to change the voltage to be applied to from the variable-voltage power supply 164 to the LF motor, depending upon the target feed distance R. However, a motor control apparatus according to the present invention may be arranged to change both of the resolution of detection of the actual feed distance and the voltage to be applied to the LF motor 20, depending upon the target feed distance R.

<Sixth Embodiment>

Figure 17:
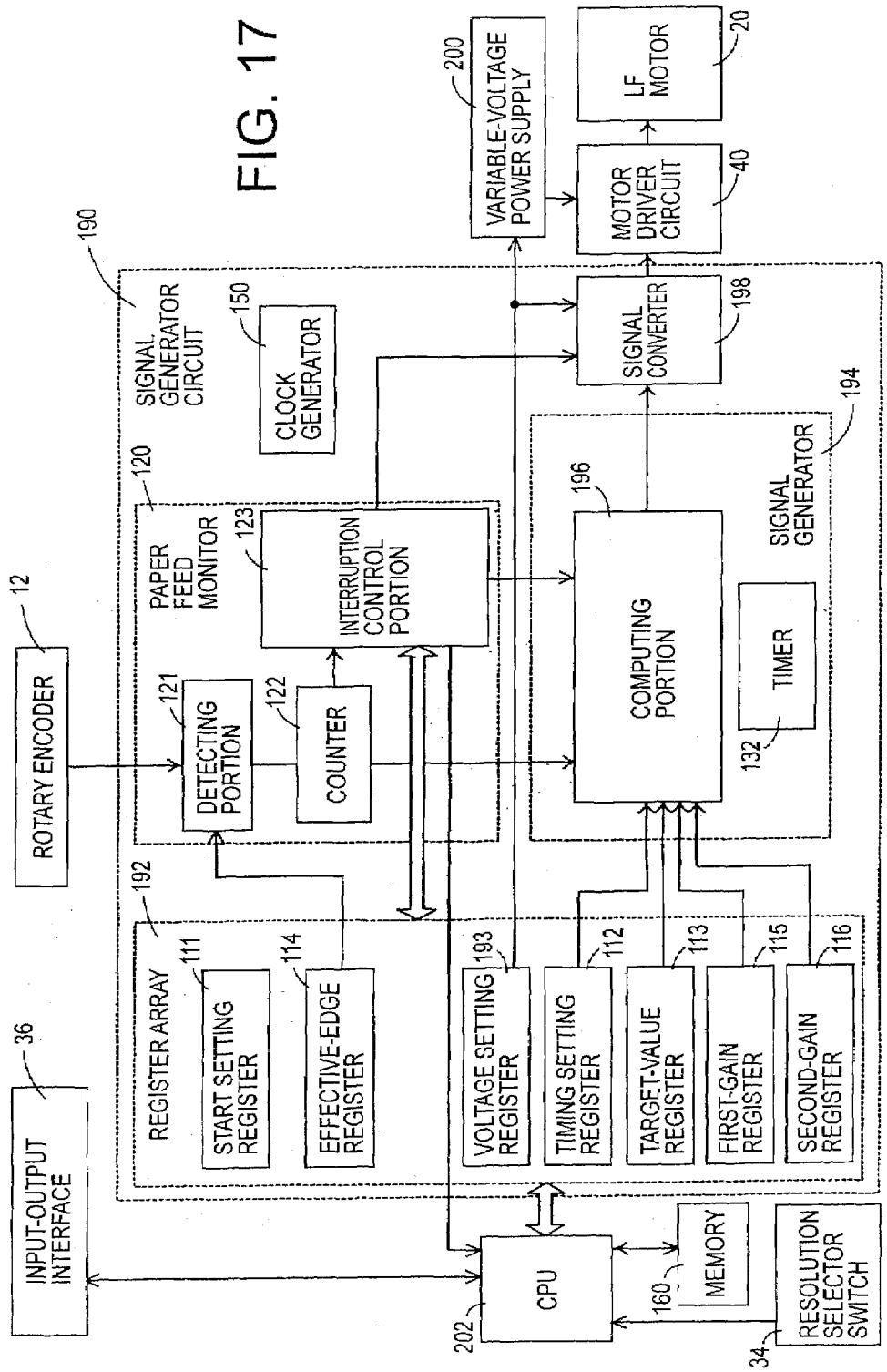
FIG. 17 is a block diagram showing a motor control apparatus according to a sixth embodiment of this invention.
Figure 18:
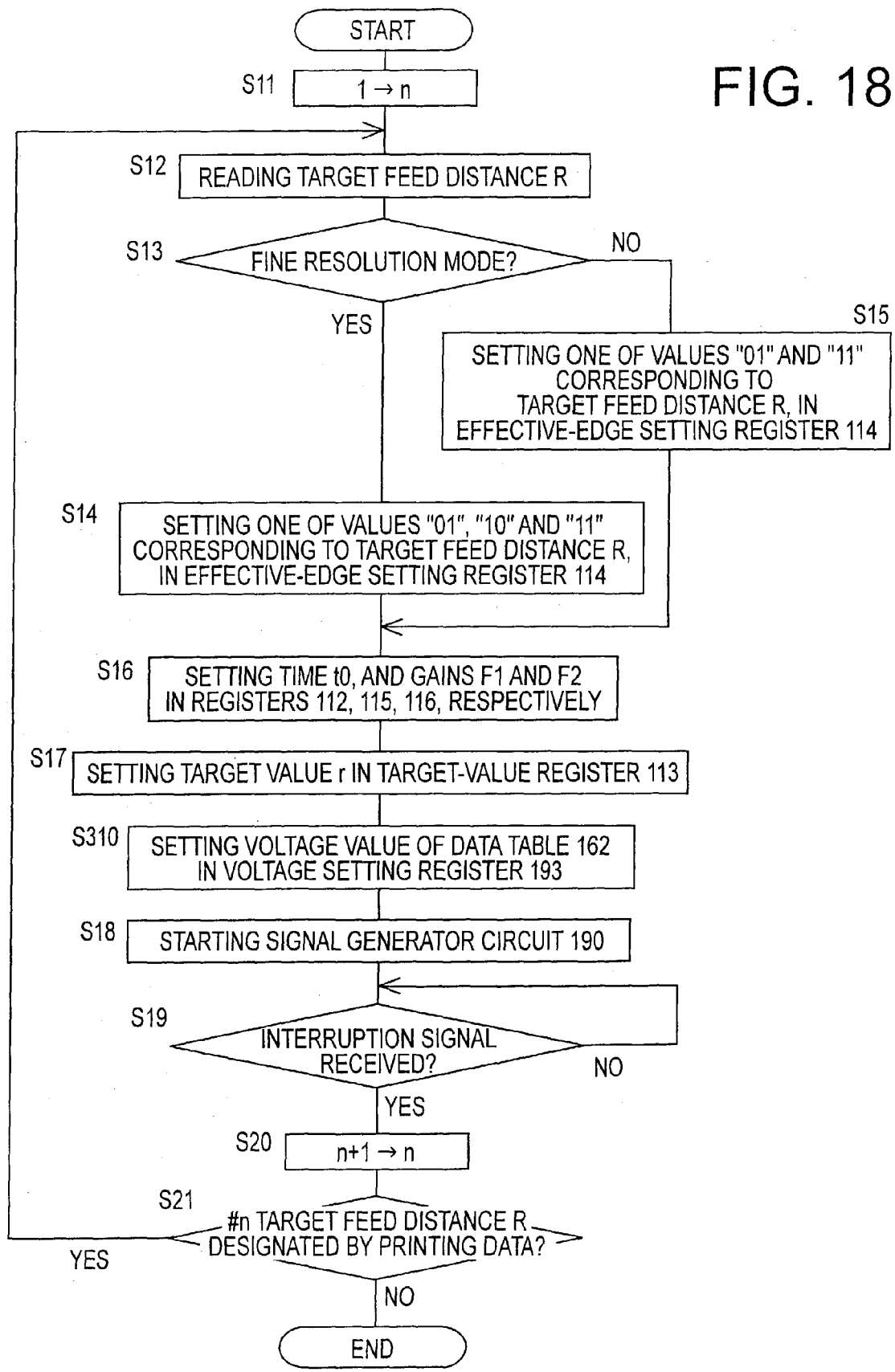
FIG. 18 is a flow chart illustrating a control routine executed by the motor control apparatus of FIG. 17.

Referring to FIGS. 17 and 18, there is shown a motor control apparatus according to a sixth embodiment of the invention, which is arranged as an example of the modification indicated above. This motor control apparatus includes a signal generator circuit 190 (ASIC) including the paper feed monitor 120, a register array 192, a signal generator 194 and a signal converter 198. The paper feed monitor 120 is the same as that of the first embodiment of FIGS. 3 and 4. Like the register array 110 of the first embodiment, the register array 192 includes the start setting register 111, timing setting register 112, target-value register 113, effective-edge register 114, first-gain register 115 and second-gain register 116. The register array 192 further includes the voltage setting register 193, as provided in the register array 153 in the fourth embodiment of FIGS. 10–13. The signal generator 194 includes a computing portion 196 connected to the signal converter 198 arranged to apply the PWM signals to the motor driver circuit 40.

Like the motor control apparatus according to the fourth embodiment, the present motor control apparatus of FIG. 17 further includes a variable-voltage power supply 200 connected to the motor driver circuit 40 and the voltage setting register 193 of the signal generator circuit 190, and a CPU 202 connected to the signal generator circuit 190 and the memory 160 which stores the data table 162 of FIG. 12. Like the motor control apparatus of the first embodiment, the present motor control apparatus further includes the resolution selector switch 34 connected to the CPU 202.

The motor control apparatus of FIG. 17 including the CPU 202 is arranged to execute a control routine illustrated in the flow chart of FIG. 18, for controlling the LF motor 20 to rotate the main roller 10 (FIG. 1) so as to feed the paper sheet by the target feed distance R. The control routine of FIG. 18 is identical with the control routine of FIG. 4 in the first embodiment, except in that step S310 corresponding to step S120 of the flow chart of FIG. 13 in the fourth embodiment is interposed between steps S17 and S18 of the flow chart of FIG. 4, so that the LF motor 20 is operated by application of a voltage which is determined on the basis of the target feed distance R and according to the data map 162 of FIG. 12 and which is set in the voltage setting register 193, while at the same time the actual feed distance of the paper sheet is detected with the resolution determined on the basis of the target feed distance R and which is represented by the value set in the effective-edge register 114.

The motor control apparatus of FIGS. 17 and 18 according to the sixth embodiment of the invention has both the advantages described above with respect to the first embodiment, and the advantages described above with respect to the fourth embodiment.

Although the LF motor 20 to be controlled by the motor control apparatus in the illustrated embodiments is a DC motor, the electric motor to be controlled by the motor control apparatus of the present invention may be a brushless DC motor. In this case, the signal converter 156, 172 is arranged to generate the PWM signals for sequentially energizing the coils of the brushless DC motor.

In the illustrated embodiments, the signal generator circuit 100, 152, 167, 190 is constituted by a so-called ASIC (Application Specific Integrated Circuit) to generate the PWM signals to be applied to the motor driver circuit 40. However, the ASIC may be replaced by a programmable logic device such as CPLD (Complex Programmable Logic Device) and FPGA (Field Programmable Gate Array).

What is claimed is:

1. An apparatus for controlling an electric motor provided to drive a movable object such that a detected actual amount of motion of a movable portion of said electric motor or said movable object coincides with a target amount of motion, comprising:

a pulse generator operable to periodically generate signal pulses such that each of the signal pulses is generated each time said movable portion of said electric motor or said movable object is driven by a predetermined amount;

an edge counter operable to count the number of at least one of a rising edge and a falling edge of said signal pulses generated by said pulse generator, a control-condition changing device including (a) a target-motion-amount setter operable to set said target amount of motion of said movable portion or said movable object, (b) a resolution selector operable to select one of different manners of counting said signal pulses by said edge counter, for thereby selecting a degree of a resolution of detection of said actual amount of motion, depending upon said target amount of motion set by said target-motion-amount setter, and (c) a target-count calculator operable to calculate a target number of the edges of said signal pulses which corresponds to said target amount set by said target-motion-amount setter, on the basis of said degree of the resolution of detection selected by said resolution selector, and a feedback motor controller comparing the number of the edges of said signal pulses counted by said edge counter with said target number of the edges calculated by said target-count calculator, and performing a feedback control of said electric motor for coincidence of said number of the edges of said signal pulses counted by said edge counter with said target number.

2. An apparatus according to claim 1, wherein said resolution selector selects the degree of said resolution of detection of said actual amount of motion such that the selected degree of said resolution of detection is lower when said target amount of motion is relatively large than when said target amount of motion is relatively small.

3. An apparatus according to claim 1, wherein said pulse generator is capable of generating a first pulse signal and a second pulse signal which have a predetermined phase difference therebetween, and said edge counter includes:

a first edge counter operable to count the rising edges of pulses of said first pulse signal;

a second edge counter operable to count the falling edges of the pulses of said first pulse signal;

a third edge counter operable to count the rising edges of pulses of said second pulse signal; and a fourth edge counter operable to count the falling edges of the pulses of said second pulse signal, and wherein said resolution selector selects said degree of said resolution of detection, by selecting an edge-counting mode in which the edges of said signal pulses are counted, from among a first edge-counting mode in which only said first edge counter is operated to establish a first degree of resolution, a second edge-counting mode in which said first and second edge counters are operated to establish a second degree of resolution higher than said first degree of resolution, a third edge-counting mode in which all of said first, second, third and fourth edge counters are operated to establish a third degree of resolution higher than said second degree of resolution.

4. An apparatus according to claim 1, wherein said resolution selector increases said degree of said resolution of detection when said detected actual amount of motion has increased to an amount which is smaller by a predetermined amount than said target amount of motion set by said target-motion-amount setter.

5. An apparatus according to claim 1, wherein said resolution selector selects a lowest one of different degrees of said resolution of detection, when said target amount of motion set by said target-motion-amount setter is larger than a predetermined threshold value.

6. An apparatus according to claim 5, wherein said movable object is one of a recording medium and a printing head in a printer wherein said printing head has a row of printing nozzles operable to deliver droplets of an ink to form an image on said recording medium and wherein said one of said recording medium and said printing head is moved relative to the other by said electric motor, and wherein said resolution selector selects said lowest one of different degrees of said resolution of detection, when a target distance of movement of said movable object as said target amount of motion is larger than a length of said row of the printing nozzles.

7. An apparatus for controlling an electric motor provided to drive a movable object such that a detected actual amount of motion of a movable portion of said electric motor or said movable object coincides with a target amount of motion, comprising:

an actual-motion-amount detector operable to detect said actual amount of motion of said movable portion of said electric motor or said movable object, a control-condition changing device including (a) a target-motion-amount setter operable to set said target amount of motion of said movable portion of said electric motor or said movable object, and (b) a voltage setter operable to set a voltage of an electric power source to be applied to said electric motor, such that said voltage is changed depending upon said target amount of motion set by said target-motion-amount setter;

a feedback motor controller including a pulse-width-modulation controller which is operable to control, by pulse-width-modulation, an electric current supplied from said electric power source with said voltage set by said voltage setter such that said actual amount of motion detected by said actual-motion-amount detector coincides with said target amount of motion set by said target-motion-amount setter;

said voltage setter setting said voltage of said electric power source to be applied to said electric motor such that said voltage is lower when said target amount of motion is relatively small than when said target amount of motion is relatively large; and wherein said voltage set is determined by said target amount of motion corresponding to a target feed distance in a memory.

8. An apparatus according to claim 7, wherein said voltage setter includes a data table memory storing a data table representative of a relationship between said target amount of motion and said voltage of said electric power source to be applied to said electric motor, and sets said voltage of said electric power source on the basis of said target amount of motion and according to said relationship.

9. An apparatus according to claim 8, wherein said control-condition changing device further includes (c) a peak-current estimator operable on the basis of said actual amount of motion detected by said actual-motion-amount detector, to estimate a maximum value of an electric current flowing through said electric motor during an operation of said electric motor for coincidence of said detected actual amount of motion with said target amount of motion set by said target-motion-amount setter, (d) a voltage calculator operable on the basis of the estimated maximum value of the electric current, to calculate a value of said voltage of said electric power source which is required for coincidence of an actual value of the electric current to coincide with said estimated maximum value of the electric current, and (e) a data-table updating device operable to update said data table by replacing a value of the voltage presently set in said data table for said target amount of motion set by said target-motion-amount setter, with the value of the voltage calculated by said voltage calculator.

10. An apparatus according to claim 9, wherein said peak-current estimator determines, as said maximum value of the electric current, a highest value of the electric current estimated according to a state-space equation which includes variable parameters representative of dynamic behaviors of said electric motor.

11. An apparatus according to claim 7, wherein said electric motor is a DC motor.

12. An apparatus according to claim 7, wherein said electric motor is a brushless motor.

13. An apparatus for controlling an electric motor provided to drive a movable object such that a detected actual amount of motion of a movable portion of said electric motor or said movable object coincides with a target amount of motion, comprising:
  an actual-motion-amount detector including (i) a pulse generator operable to periodically generate signal pulses such that each of the signal pulses is generated each time said movable portion of the electric motor or said movable object is driven by a predetermined amount, and (ii) an edge counter operable to count the number of at least one of a rising edge and a falling edge of said signal pulses generated by said pulse generator;
  a target-motion-amount setter operable to set said target amount of motion of said movable portion or said movable object;
  a resolution selector operable to select one of different manners of counting said signal pulse by said edge counter, for thereby selecting a degree of said resolution of detection of said actual amount of motion, depending upon said target amount of motion set by said target-motion-amount setter;
  a target-count calculator operable to calculate, on the basis of said degree of the resolution of detection selected by said resolution selector, a target number of the edges of said signal pulses counted by said edge counter, the target number corresponding to said target amount set by said target-motion-amount setter;
  a voltage setter operable to set a voltage of an electric power source to be applied to said electric motor, such that said voltage is changed depending upon said actual amount of motion set by said target-motion-amount setter; and
  a feedback motor controller which compares the number of the edges of said signal pulses counted by said edge counter, with said target number of the edges calculated by said target-count calculator, and performs a feedback control, by pulse-width-modulation, of a current supplied from said electric power source to said electric motor with said voltage, for coincidence of said number of the edges of said signal pulses counted by said edge counter with said target number.

14. A method of controlling an electric motor provided to drive a movable object such that a detected actual amount of motion of a movable portion of said electric motor or said movable object coincides with a target amount of motion, comprising steps of:
  setting said target amount of motion of said movable portion or said movable object;
  selecting a degree of said resolution of detection of said actual amount of motion, depending upon the set target amount of motion;
  calculating a target number of at least one of a rising edge and a falling edge of signal pulses which are periodically generated such that each of the signal pulses is generated each time said movable portion of the electric motor or said movable object is driven by a predetermined amount, by a manner corresponding to the selected degree of the resolution of detection, the calculated number corresponding to the set target amount of motion;
  counting the number of the at least one of the rising and falling edges of the signal pulses by said manner; and
  feedback-controlling said electric motor by comparing the counted number of the edges of the signal pulses with the calculated target number of the edges, and performing a feedback control of said electric motor, for coincidence of said number of the edges of said signal pulses counted by said edge counter with said target number.

15. A method according to claim 14, wherein said step of selecting a degree of said resolution of detection of said actual amount of motion comprises selecting the degree of said resolution of detection of said actual amount of motion such that the selected degree of said resolution of detection is lower when said target amount of motion is relatively large than when said target amount of motion is relatively small.

16. A method according to claim 14, wherein said step of selecting a degree of said resolution of detection of said actual amount of motion comprises selecting the degree of said resolution of detection, by selecting an edge-counting mode in which the edges of said signal pulses are counted, from among a first edge-counting mode in which only the rising edges of pulses of a first pulse signal are counted to establish a first degree of resolution, a second edge-counting mode in which the rising and falling edges of the pulses of said first pulse signal are counted to establish a second degree of resolution higher than said first degree of resolution, and a third edge-counting mode in which the rising and falling edges of the pulses of said first pulse signal and the rising and falling edges of pulses of a second pulse signal having a predetermined phase difference with respect to said first pulse signal are counted to establish a third degree of resolution higher than said second degree of resolution.

17. A method according to claim 14, wherein said step of selecting a degree of said resolution of detection of said actual amount of motion comprises increasing said degree of said resolution of detection when said detected actual amount of motion has increased to an amount which is smaller by a predetermined amount than said target amount of motion set by said target-motion-amount setter.

18. A method of controlling an electric motor provided to drive a movable object such that a detected actual amount of motion of a movable portion of said electric motor or said movable object coincides with a target amount of motion, comprising steps of:
  changing a voltage of an electric power source to be applied to said electric motor, depending upon said target amount of motion, wherein said target amount of motion corresponds to a target feed distance in a memory;
  controlling, by pulse-width-modulation, a current supplied from said electric power source to said electric motor with said voltage changed in said step of changing said voltage of said electric power source, on the basis of said actual amount of motion detected, such that said detected actual amount of motion coincides with said target amount of motion; and said step of changing said voltage of said electric power source comprising changing said voltage such that said voltage is lower when said target amount of motion is relatively small than when said target amount of motion is relatively large.

19. A method according to claim 18, wherein said step of changing said voltage of said electric power source comprises storing a data table representative of a relationship between said target amount of motion and said voltage of said electric power source to be applied to said electric motor, and determining said voltage of said electric power source on the basis of said target amount of motion and according to said relationship.

20. A method according to claim 19, wherein said step of changing said voltage of said electric power source to be applied to said electric motor, depending upon said target amount of motion comprises:
   estimating a maximum value of an electric current flowing through said electric motor during an operation of said electric motor for coincidence of said detected actual amount of motion with said target amount of motion, on the basis of said detected actual amount of motion;
   calculating, on the basis of the estimated maximum value of the electric current supplied from said electric power source with said voltage, a value of said voltage which is required for coincidence of an actual value of the electric current to coincide with said estimated maximum value of the electric current; and
   updating said data table by replacing a value of the voltage presently set in said data table for said set target amount of motion, with the calculated value of the voltage.

21. A method of controlling an electric motor provided to drive a movable object such that a detected actual amount of motion of a movable portion of said electric motor or said movable object coincides with a target amount of motion, comprising steps of:
   setting said target amount of motion of said movable portion or said movable object;
   selecting a degree of said resolution of detection of said actual amount of motion, depending upon the set target amount of motion;
   calculating a target number of at least one of a rising edge and a falling edge of signal pulses which are periodically generated such that each of the signal pulses is generated each time said movable portion of the electric motor or said movable object is driven by a predetermined amount, by a manner corresponding to the selected degree of the resolution of detection, the calculated number corresponding to the set target amount of motion;
   counting the number of the at least one of the rising and falling edges of the signal pulses by said manner;
   changing a voltage of an electric power source to be applied to said electric motor, depending upon said target amount of motion; and
   feedback-controlling said electric motor by comparing the counted number of the edges of the signal pulses with the calculated target number of the edges, and performing a feedback control, by pulse-width-modulation, of a current supplied from said electric power source to said electric motor with said voltage, for coincidence of said number of the edges of said signal pulses counted by said edge counter with said target number.

\* \* \* \* \*